United States Patent
Lee

(10) Patent No.: US 11,358,069 B2
(45) Date of Patent: Jun. 14, 2022

(54) ACTION ROBOT

(71) Applicant: LG ELECTRONICS INC., Seoul (KR)

(72) Inventor: Jongwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 321 days.

(21) Appl. No.: 16/655,902

(22) Filed: Oct. 17, 2019

(65) Prior Publication Data

US 2021/0086092 A1    Mar. 25, 2021

(30) Foreign Application Priority Data

Sep. 24, 2019  (KR) .......................... 10-2019-0117727

(51) Int. Cl.
| | |
|---|---|
| *A63H 11/00* | (2006.01) |
| *A63H 29/24* | (2006.01) |
| *A63H 31/10* | (2006.01) |
| *H02K 7/075* | (2006.01) |
| *H02K 7/116* | (2006.01) |
| *A63H 5/00* | (2006.01) |

(52) U.S. Cl.
CPC ............. *A63H 11/00* (2013.01); *A63H 29/24* (2013.01); *A63H 31/10* (2013.01); *H02K 7/075* (2013.01); *H02K 7/116* (2013.01); *A63H 5/00* (2013.01); *A63H 2200/00* (2013.01)

(58) Field of Classification Search
CPC ........ A63H 11/00; A63H 13/00; A63H 29/24; A63H 31/10; A63H 5/00; A63H 2200/00
USPC ..... 446/73, 83, 84, 331, 333, 334, 336, 352, 446/358, 359, 360, 361, 362, 366, 367
See application file for complete search history.

(56) References Cited

U.S. PATENT DOCUMENTS

| | | | | |
|---|---|---|---|---|
| 1,628,331 A | * | 5/1927 | Alonzo ................. | A63H 33/40 40/412 |
| 1,788,671 A | * | 1/1931 | Heideklang ............. | A63H 7/00 446/362 |
| 2,254,091 A | * | 8/1941 | Rossi ..................... | A63H 13/00 40/455 |
| 2,585,467 A | * | 2/1952 | Huth ...................... | A63H 13/12 40/418 |
| 2,725,671 A | * | 12/1955 | Morsch ................. | A63H 13/12 446/352 |

(Continued)

*Primary Examiner* — Joseph B Baldori
(74) *Attorney, Agent, or Firm* — Ked & Associates LLP

(57) ABSTRACT

An action robot according to an embodiment of the present disclosure may include a figure configured to have a plurality of joints, a figure base configured to support the figure from below, a plurality of seesaw levers configured to be embedded in the figure base, the plurality of seesaw levers being configured to be disposed to be long in a radial direction of the figure base, the plurality of seesaw levers being configured to be spaced apart from each other in a circumferential direction of the figure base, a wire configured to be connected to an inner end portion of the seesaw lever to pivot the joint, a plurality of rods configured to be disposed vertically, the plurality of rods being configured to press an outer end portion of the seesaw lever upward, at least one lifter configured to raise the rod, and a revolution mechanism configured to revolve the lifter about a virtual vertical axis passing through a center of the figure base. The number of the lifters may be less than the number of rods.

16 Claims, 25 Drawing Sheets

(56) References Cited

U.S. PATENT DOCUMENTS

| | | | | |
|---|---|---|---|---|
| 3,964,205 A * | 6/1976 | Kuramochi | ............... | A63H 3/18 |
| | | | | 446/338 |
| 4,209,940 A * | 7/1980 | Meyer | ................. | A63F 9/00 |
| | | | | 446/300 |
| 4,778,432 A * | 10/1988 | Yeu | ................. | A63H 13/04 |
| | | | | 446/300 |
| 4,901,459 A * | 2/1990 | Lee | ................. | G09F 19/08 |
| | | | | 40/414 |
| 5,011,450 A * | 4/1991 | Chen | ................. | A63H 5/00 |
| | | | | 40/418 |
| 5,870,842 A * | 2/1999 | Ogden | ............... | G09F 19/08 |
| | | | | 40/411 |
| 6,021,594 A * | 2/2000 | Krueger | ............... | A01M 31/06 |
| | | | | 43/2 |
| 6,572,433 B1 * | 6/2003 | Hou | ................. | A63H 13/04 |
| | | | | 446/330 |
| 6,638,135 B2 * | 10/2003 | Fong | ................ | A63H 13/20 |
| | | | | 40/430 |
| 8,157,612 B2 * | 4/2012 | Rehkemper | ............ | A63H 13/04 |
| | | | | 446/331 |

* cited by examiner

ACTION ROBOT

CROSS-REFERENCE TO RELATED APPLICATIONS

This application claims the benefit of the Korean Patent Application No. 10-2019-0117727 filed on 24 Sep. 2019, which is hereby incorporated by reference as if fully set forth herein.

BACKGROUND

The present disclosure relates to an action robot, and more particularly, to an action robot including at least one joint.

As robot technology advances, a method of modularizing joints or wheels to manufacture a robot is being used. For example, various types of robots such as puppies, dinosaurs, humans, and spiders may be manufactured by electrically and mechanically connecting and assembling a plurality of actuator modules configuring a robot.

A robot capable of being manufactured by assembling a plurality of actuator modules is generally referred to as a modular robot. Each actuator module configuring a modular robot includes a motor, and thus, a motion of a robot is performed based on a rotation of the motor. Such a motion of a robot is a concept which denotes motions of a robot such as an action and dance.

Recently, robots for entertainments are attracting much attention, and thus, interest in robots for arousing the interest of persons or recreation is increasing. For example, technologies for allowing a user to dance according to music or take a motion or expression according to story (children's story and the like) are being developed.

This denotes that a plurality of motions based on music or children's story are previously set, and when the music or the children's story is reproduced by an external device, an action robot performs a motion by executing a motion previously set based thereon.

SUMMARY

One object of the present disclosure is to provide an action robot that can easily rotate a plurality of joints with a small number of lifters.

An action robot according to an embodiment of the present disclosure may include a figure configured to have a plurality of joints, a figure base configured to support the figure from below, a plurality of seesaw levers configured to be embedded in the figure base, the plurality of seesaw levers being configured to be disposed to be long in a radial direction of the figure base, the plurality of seesaw levers being configured to be spaced apart from each other in a circumferential direction of the figure base, a wire configured to be connected to an inner end portion of the seesaw lever to pivot the joint, a plurality of rods configured to be disposed vertically, the plurality of rods being configured to press an outer end portion of the seesaw lever upward, at least one lifter configured to raise the rod, and a revolution mechanism configured to revolve the lifter about a virtual vertical axis passing through a center of the figure base. The number of lifters may be less than the number of rods.

A wire through hole through which the wire passes may be formed on an upper surface of the figure base, and a rod passing hole through which the rod passes may be formed on a lower surface of the figure base.

Inner end portions of the plurality of seesaw levers may be located on a first virtual circle which has the virtual vertical axis as a center, and the outer end portions of the plurality of seesaw levers may be located on a second virtual circle which has the virtual vertical axis as a center, and a diameter of the second virtual circle is larger than a diameter of the first virtual circle.

the revolution mechanism may include a rotation plate configured to allow the lifter to be seated, the rotation plate being configured to rotate about the virtual vertical axis; a fixed gear configured to be located below the rotation plate, the fixed gear being configured to have the virtual vertical axis as a central axis; a moving gear configured to be engaged with the fixed gear, the moving gear configured to revolve along the outer circumference of the fixed gear; and a rotation motor configured to be mounted to the rotation plate, the rotation motor being configured to rotate the moving gear.

The revolution mechanism may include a rotation plate configured to allow the lifter to be seated, the rotation plate being configured to rotate about the virtual vertical axis, a rotation motor configured to be spaced apart from the lower side of the rotation plate, a driving gear configured to be connected to the rotation motor, and a driven gear configured to be engaged with the driving gear, the driven gear being configured to be fastened to a lower surface of the rotation plate, the driven gear being configured to rotate about the virtual vertical axis.

The lifter may be provided in plurality which are spaced apart from each other in the circumferential direction of the rotation plate.

The lifter may include a motor configured to be seated on the rotation plate, and a lever configured to be connected to the motor, the lever being configured to press a lower end of the rod upward, the lever being configured to be disposed to be long in the radial direction of the rotation plate.

A rotation axis of the motor may be horizontal, and the rotation axis of the rotation motor may be vertical.

The action robot may further include a rod guide configured to be disposed below the figure base, the rod guide being configured to guide the lifting and lowering of the rod, and a guide supporter configured to be disposed below the rod guide, the guide supporter being configured to allow the lifter and the revolution mechanism to be embedded.

The rod guide may include a guide body configured to have an opened upper surface, a lower guide hole configured to be formed at a lower surface of the guide body, the lower guide hole being configured to allow the rod to be passed through, a guide cover configured to cover the opened upper surface of the guide body, and an upper guide hole configured to be formed on the guide cover, the upper guide hole being configured to allow the rod to be passed through.

The rod may be formed with a stopper which is formed on an outer circumference of the rod, located between the lower guide hole and the upper guide hole and has a diameter larger than an inner diameter of the lower guide hole.

The revolution mechanism may include a fixed gear configured to have the virtual vertical axis as a central axis, a moving gear configured to be engaged with the fixed gear, the moving gear being configured to revolve along the outer circumference of the fixed gear, and a rotation motor configured to rotate the moving gear. The lifter may be connected to the moving gear or the rotation motor.

A rotation period of the moving gear and a revolution period of the moving gear may be the same as each other.

The revolution mechanism may further include a support plate configured to be positioned below the lifter, the support plate being configured to be positioned above the fixed gear and the moving gear, and a guide groove configured to be formed on the support plate, the guide groove being configured to guide the revolution of the lifter, the guide groove being configured to have a circular or arc shape.

The revolution mechanism may include a rotation motor, a driving gear configured to have the virtual vertical axis as a central axis, the driving gear being configured to rotate by the rotation motor, and a driven gear configured to be engaged with the driving gear, the driven gear being configured to revolve along the outer circumference of the driving gear. The lifter may be connected to the driven gear.

A rotation period of the driven gear and a revolution period of the driven gear may be the same as each other.

The revolution mechanism may further include a support plate configured to support the lifter from below, the support plate being configured to be positioned above the driving gear and the driven gear, and a guide groove configured to be formed on the support plate, the guide groove being configured to guide the revolution of the lifter, the guide groove being configured to have a circular or arc shape.

The lifter may be provided in plurality, and the driving gear for revolving one lifter may be located above the driving gear for revolving another lifter.

DETAILED DESCRIPTION OF THE EMBODIMENTS

Figure 1:
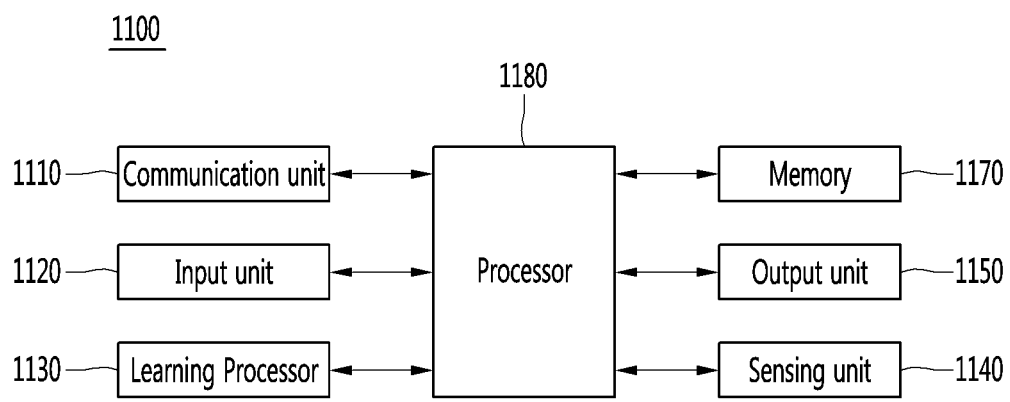
FIG. 1 illustrates an AI device 1100 including a robot according to an embodiment of the present disclosure.

Hereinafter, specific embodiments of the present disclosure will be described in detail with reference to the drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers.

Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 1100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 1100 may include a communication unit 1110, an input unit 1120, a learning processor 1130, a sensing unit 1140, an output unit 1150, a memory 1170, and a processor 1180.

The communication unit 1110 may transmit and receive data to and from external devices such as other AI devices 1100a to 1100e and the AI server 1200 by using wire/wireless communication technology. For example, the communication unit 1110 may transmit and receive sensor information, a user input, a learning model, and a control signal to and from external devices.

The communication technology used by the communication unit 1110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 1120 may acquire various kinds of data.

At this time, the input unit 1120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 1120 may acquire a learning data for model learning and an input data to be used when an output is acquired by using learning model. The input unit 1120 may acquire raw input data. In this case, the processor 1180 or the learning processor 1130 may extract an input feature by preprocessing the input data.

The learning processor 1130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 1130 may perform AI processing together with the learning processor 1240 of the AI server 1200.

At this time, the learning processor 1130 may include a memory integrated or implemented in the AI device 1100. Alternatively, the learning processor 1130 may be implemented by using the memory 1170, an external memory directly connected to the AI device 1100, or a memory held in an external device.

The sensing unit 1140 may acquire at least one of internal information about the AI device 1100, ambient environment information about the AI device 1100, and user information by using various sensors.

Examples of the sensors included in the sensing unit 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 1150 may generate an output related to a visual sense, an auditory sense, or a haptic sense.

At this time, the output unit 1150 may include a display unit for outputting time information, a speaker for outputting auditory information, and a haptic module for outputting haptic information.

The memory 1170 may store data that supports various functions of the AI device 1100. For example, the memory 1170 may store input data acquired by the input unit 1120, learning data, a learning model, a learning history, and the like.

The processor 1180 may determine at least one executable operation of the AI device 1100 based on information determined or generated by using a data analysis algorithm or a machine learning algorithm. The processor 1180 may control the components of the AI device 1100 to execute the determined operation.

To this end, the processor 1180 may request, search, receive, or utilize data of the learning processor 1130 or the memory 1170. The processor 1180 may control the components of the AI device 1100 to execute the predicted operation or the operation determined to be desirable among the at least one executable operation.

When the connection of an external device is required to perform the determined operation, the processor 1180 may generate a control signal for controlling the external device and may transmit the generated control signal to the external device.

The processor 1180 may acquire intention information for the user input and may determine the user's requirements based on the acquired intention information.

The processor 1180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 1130, may be learned by the learning processor 1240 of the AI server 1200, or may be learned by their distributed processing.

The processor 1180 may collect history information including the operation contents of the AI apparatus 1100 or the user's feedback on the operation and may store the collected history information in the memory 1170 or the learning processor 1130 or transmit the collected history information to the external device such as the AI server 1200. The collected history information may be used to update the learning model.

The processor 1180 may control at least part of the components of AI device 1100 so as to drive an application program stored in memory 1170. Furthermore, the processor 1180 may operate two or more of the components included in the AI device 1100 in combination so as to drive the application program.

Figure 2:
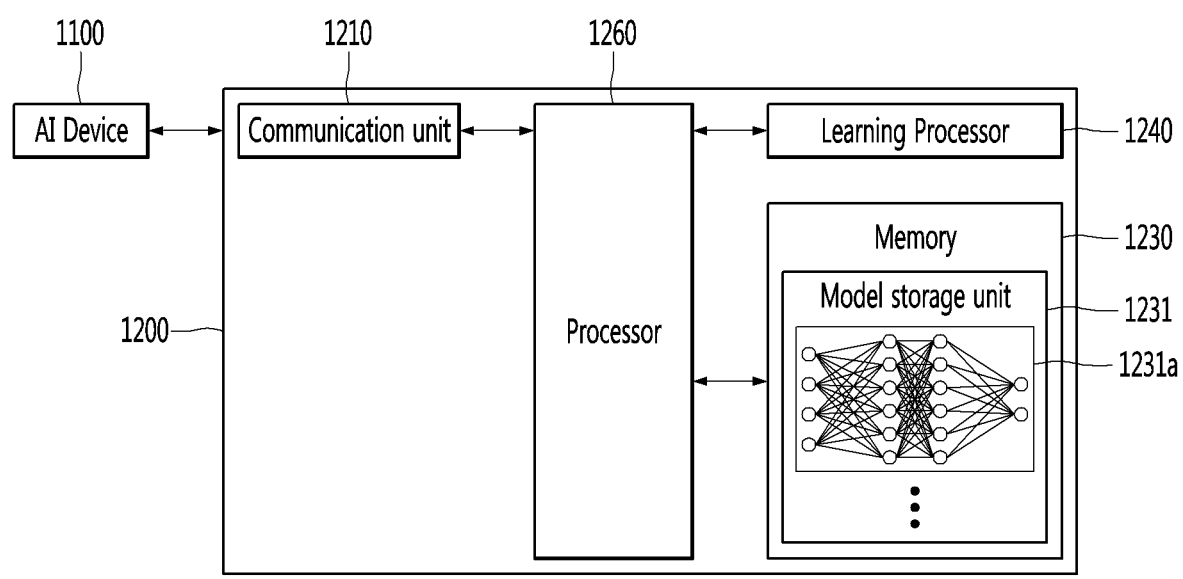
FIG. 2 illustrates an AI server 1200 connected to a robot according to an embodiment of the present disclosure.

FIG. 2 illustrates an AI server 1200 connected to a robot according to an embodiment of the present disclosure.

Referring to FIG. 2, the AI server 1200 may refer to a device that learns an artificial neural network by using a machine learning algorithm or uses a learned artificial neural network. The AI server 1200 may include a plurality of servers to perform distributed processing, or may be defined as a 5G network. At this time, the AI server 1200 may be included as a partial configuration of the AI device 1100, and may perform at least part of the AI processing together.

The AI server 1200 may include a communication unit 1210, a memory 1230, a learning processor 1240, a processor 1260, and the like.

The communication unit 1210 can transmit and receive data to and from an external device such as the AI device 1100.

The memory 1230 may include a model storage unit 1231. The model storage unit 1231 may store a learning or learned model (or an artificial neural network 1231*a*) through the learning processor 1240.

The learning processor 1240 may learn the artificial neural network 1231*a* by using the learning data. The learning model may be used in a state of being mounted on the AI server 1200 of the artificial neural network, or may be used in a state of being mounted on an external device such as the AI device 1100.

The learning model may be implemented in hardware, software, or a combination of hardware and software. If all or part of the learning models are implemented in software, one or more instructions that constitute the learning model may be stored in memory 1230.

The processor 1260 may infer the result value for new input data by using the learning model and may generate a response or a control command based on the inferred result value.

Figure 3:
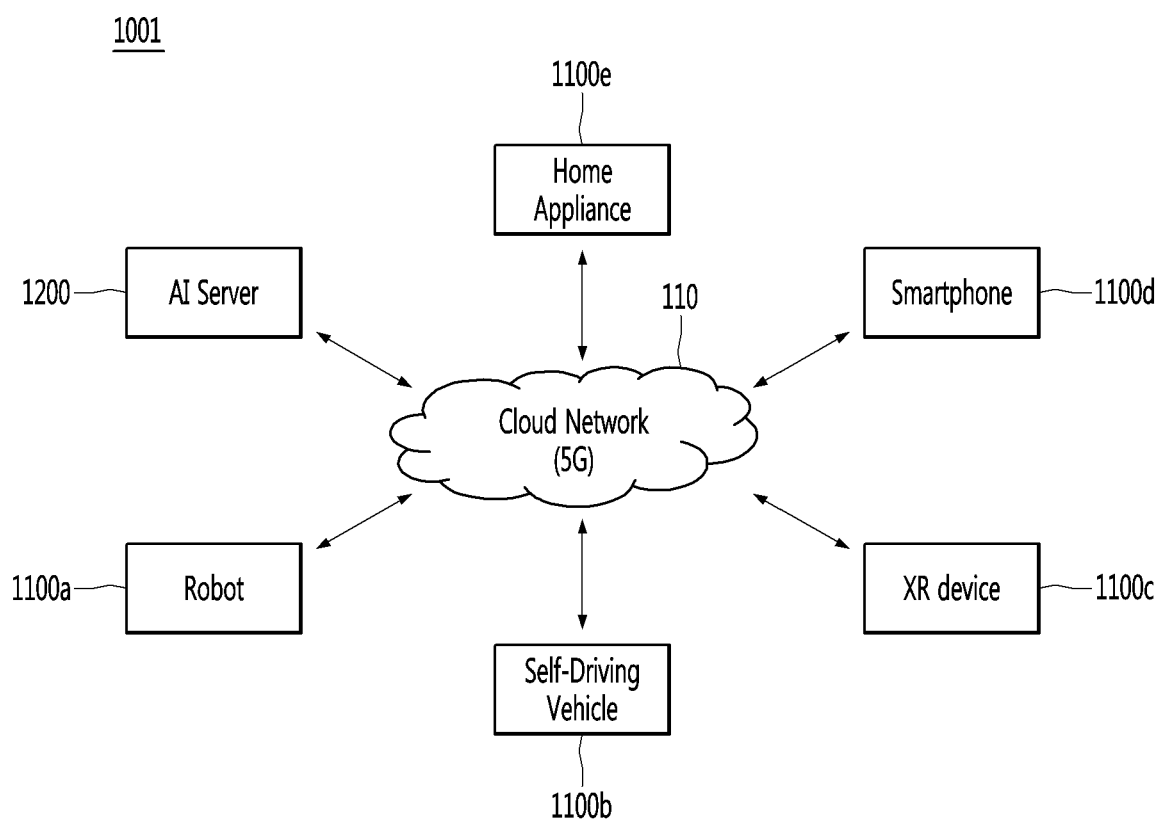
FIG. 3 illustrates an AI system 1001 according to an embodiment of the present disclosure.

FIG. 3 illustrates an AI system 1001 according to an embodiment of the present disclosure.

Referring to FIG. 3, in the AI system 1001, at least one of an AI server 1200, a robot 1100*a*, a self-driving vehicle 1100*b*, an XR device 1100*c*, a smartphone 1100*d*, or a home appliance 1100*e* is connected to a cloud network 1010. The robot 1100*a*, the self-driving vehicle 1100*b*, the XR device 1100*c*, the smartphone 1100*d*, or the home appliance 1100*e*, to which the AI technology is applied, may be referred to as AI devices 1100*a* to 1100*e*.

The cloud network 1010 may refer to a network that forms part of a cloud computing infrastructure or exists in a cloud computing infrastructure. The cloud network 1010 may be configured by using a 3G network, a 4G or LTE network, or a 5G network.

In other words, the devices 1100*a* to 1100*e* and 1200 configuring the AI system 1001 may be connected to each other through the cloud network 1010. In particular, each of the devices 1100*a* to 1100*e* and 1200 may communicate with each other through a base station, but may directly communicate with each other without using a base station.

The AI server 1200 may include a server that performs AI processing and a server that performs operations on big data.

The AI server 1200 may be connected to at least one of the AI devices constituting the AI system 1001, that is, the robot 1100*a*, the self-driving vehicle 1100*b*, the XR device 1100*c*, the smartphone 1100*d*, or the home appliance 1100*e* through the cloud network 1010, and may assist at least part of AI processing of the connected AI devices 1100*a* to 1100*e*.

At this time, the AI server 1200 may learn the artificial neural network according to the machine learning algorithm instead of the AI devices 1100*a* to 1100*e*, and may directly store the learning model or transmit the learning model to the AI devices 1100*a* to 1100*e*.

At this time, the AI server 1200 may receive input data from the AI devices 1100*a* to 1100*e*, may infer the result value for the received input data by using the learning model, may generate a response or a control command based on the inferred result value, and may transmit the response or the control command to the AI devices 1100*a* to 1100*e*.

Alternatively, the AI devices 1100*a* to 1100*e* may infer the result value for the input data by directly using the learning model, and may generate the response or the control command based on the inference result.

Hereinafter, various embodiments of the AI devices 1100*a* to 1100*e* to which the above-described technology is applied will be described. The AI devices 1100*a* to 1100*e* illustrated in FIG. 3 may be regarded as a specific embodiment of the AI device 1100 illustrated in FIG. 1.

<AI+Robot>

The robot 1100*a*, to which the AI technology is applied, may be implemented as a guide robot, a carrying robot, a cleaning robot, a wearable robot, an entertainment robot, a pet robot, an unmanned flying robot, or the like.

The robot 1100*a* may include a robot control module for controlling the operation, and the robot control module may refer to a software module or a chip implementing the software module by hardware.

The robot 1100*a* may acquire state information about the robot 1100*a* by using sensor information acquired from various kinds of sensors, may detect (recognize) surrounding environment and objects, may generate map data, may determine the route and the travel plan, may determine the response to user interaction, or may determine the operation.

The robot 1100*a* may use the sensor information acquired from at least one sensor among the lidar, the radar, and the camera so as to determine the travel route and the travel plan.

The robot 1100a may perform the above-described operations by using the learning model composed of at least one artificial neural network. For example, the robot 1100a may recognize the surrounding environment and the objects by using the learning model, and may determine the operation by using the recognized surrounding information or object information. The learning model may be learned directly from the robot 1100a or may be learned from an external device such as the AI server 1200.

At this time, the robot 1100a may perform the operation by generating the result by directly using the learning model, but the sensor information may be transmitted to the external device such as the AI server 1200 and the generated result may be received to perform the operation.

The robot 1100a may use at least one of the map data, the object information detected from the sensor information, or the object information acquired from the external apparatus to determine the travel route and the travel plan, and may control the driving unit such that the robot 1100a travels along the determined travel route and travel plan.

The map data may include object identification information about various objects arranged in the space in which the robot 1100a moves. For example, the map data may include object identification information about fixed objects such as walls and doors and movable objects such as pollen and desks. The object identification information may include a name, a type, a distance, and a position.

In addition, the robot 1100a may perform the operation or travel by controlling the driving unit based on the control/interaction of the user. At this time, the robot 1100a may acquire the intention information of the interaction due to the user's operation or speech utterance, and may determine the response based on the acquired intention information, and may perform the operation.

Figure 4:
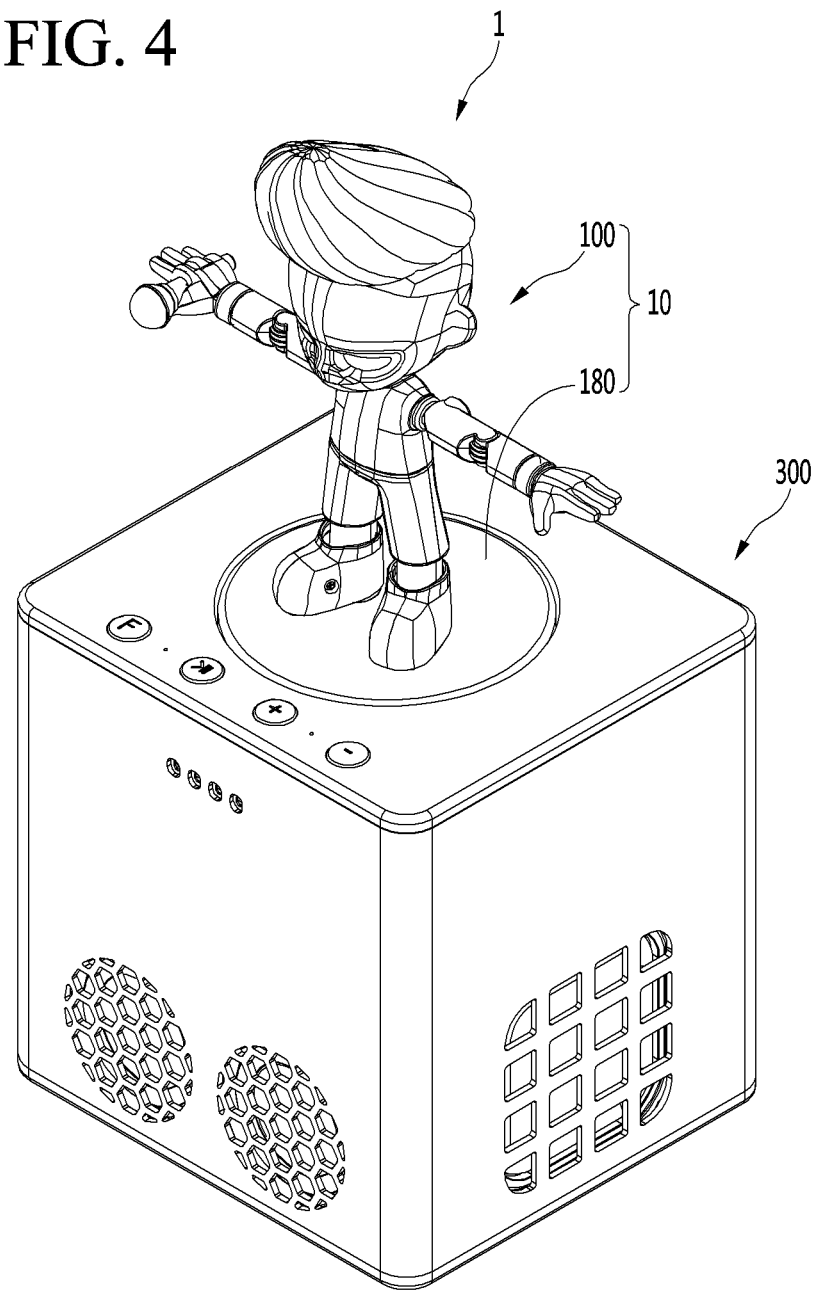
FIG. 4 is a perspective view of an action robot according to an embodiment.
Figure 5:
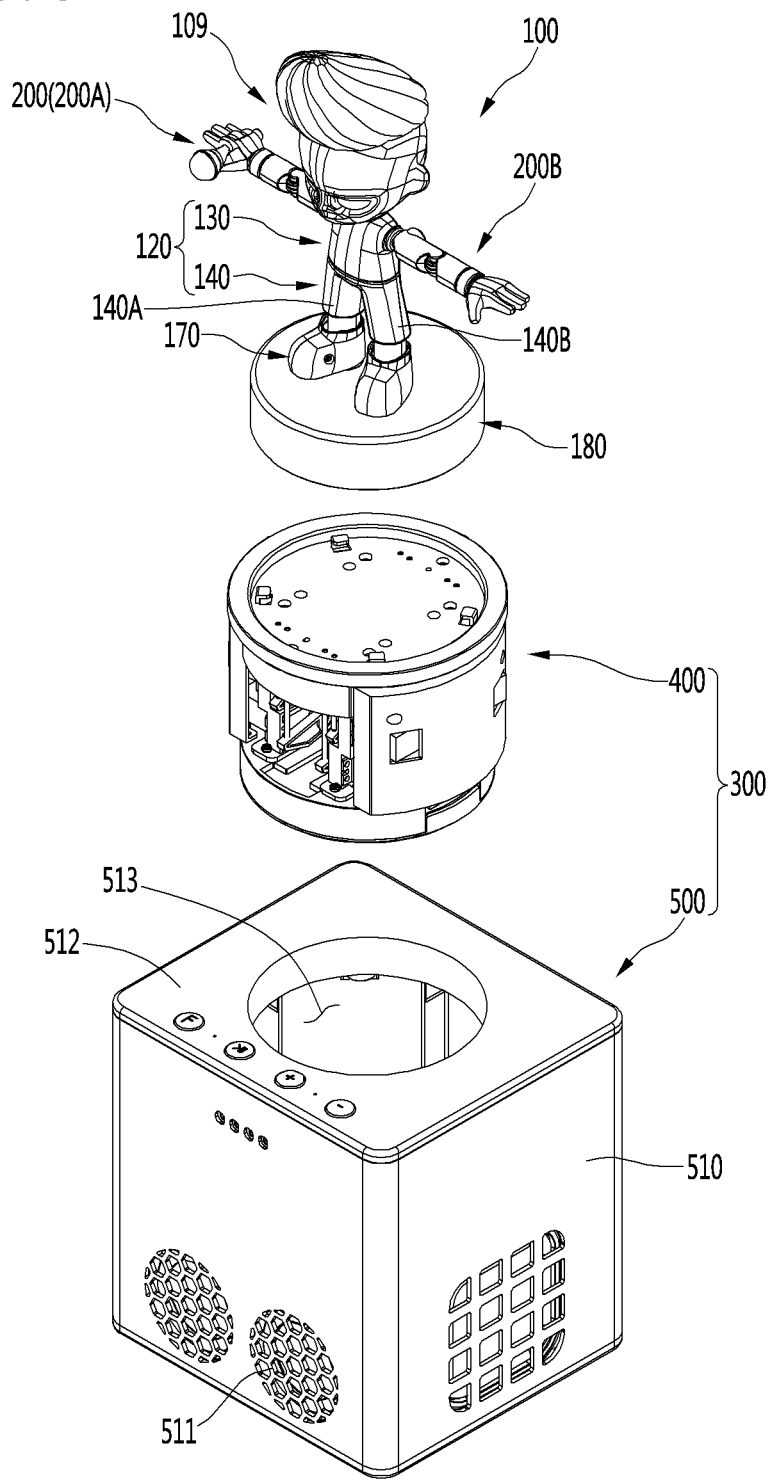
FIG. 5 is an exploded perspective view of an action robot according to an embodiment.
Figure 6:
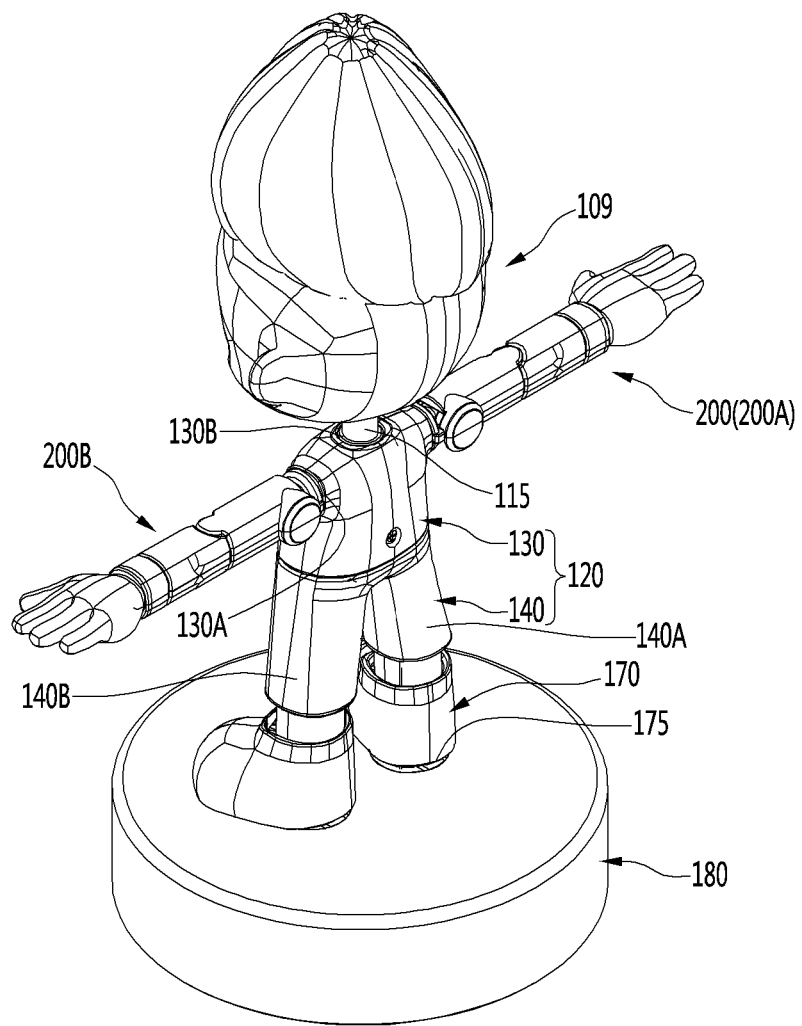
FIG. 6 is a diagram when a figure module according to an embodiment is seen from a rear region.

FIG. 4 is a perspective view of an action robot 1 according to an embodiment, FIG. 5 is an exploded perspective view of an action robot according to an embodiment, and FIG. 6 is a diagram when a figure module according to an embodiment is seen from a rear region.

The action robot 1 according to an embodiment may be included in the robot 1100a described above.

The action robot 1 according to an embodiment may include a figure module 10 and a base module which supports the figure module at a lower side.

The figure module 10 may include a FIG. 100 and a figure base 180 which supports the FIG. 100 at a lower side.

The FIG. 100 may have a shape similar to that of a human body. However, the present disclosure is not limited thereto, and the FIG. 100 may have a shape of an animal or the like.

The FIG. 100 may include a head unit 109, a body 120, a movable assembler 200, and a foot 170. Herein, an example where the FIG. 100 has a shape of a person will be described. Hereinafter, therefore, the movable assembler 200 may be referred to as an arm assembler 200.

The head unit 109 may have a shape corresponding to a head of a person. The head unit 109 may be connected to an upper side of the body 120. The head unit 109 may include a supporting bar 115 connected to the body 120. The supporting bar 115 may correspond to a neck of a human body.

The body 120 may have a shape corresponding to a human body. The body 120 may be fixed and may not move. A space where various components are embedded may be provided in the body 120.

The body 120 may include an upper body 130 and a lower body 140.

An internal space of the upper body 130 may communicate with an internal space of the lower body 140.

The upper body 130 may have a shape corresponding to an upper half of a human body. The arm assembler 200 may be connected to the upper body 130. An arm assembly connection hole 130A connected to the arm assembler 200 may be provided in both sides of the upper body 130.

Moreover, a head connection hole 130B connected to the head unit 109 may be provided in an upper portion of the upper body 130. The supporting bar 115 may pass through the head connection hole 130B.

The lower body 140 may have a shape corresponding to a lower half of a human body. The lower body 140 may include a pair of legs 140A and 140B.

The upper body 130 and the lower body 140 may be detachably fastened to each other. Therefore, an assembly of the body 130 may be simplified, and moreover, components disposed in the body 130 may be easily maintained.

The arm assembly 200 may be connected to both sides of the body 120. In more detail, a pair of arm assemblies 200 may be respectively connected to both sides of the upper body 130.

The pair of arm assemblies 200 may include a right arm assembly 200A corresponding to a right arm of a person and a left arm assembly 200B corresponding to a left arm of a person. Each of the right arm assembly 200A and the left arm assembly 200B may independently move.

The arm assembly 200 may be rotate with respect to the body 120.

The foot 170 may be connected to a lower portion of the lower body 140, namely, a lower portion of each of the pair of legs 140A and 140B. The foot 170 may be supported by the figure base 180.

A portion of a lower end of the foot 170 may be spaced apart from an upper surface of the figure base 180 to provide an inclined portion 175 which forms a certain interval. The inclined portion 175 may be provided at a rear lower end of the foot 170. Accordingly, the foot 170 may move while nodding with respect to the figure base 180.

The figure base 180 may support the foot 170 at a lower side. The figure base 180 may be fastened to the base module 300 at an upper side of the base module 300.

The figure base 180 may have an approximately cylindrical hollow shape.

The base module 300 may support the figure module 10 at a lower side. In more detail, the base module 300 may support the figure base 180 at a lower side.

The figure base 180 may be detachably fastened to the base module 300.

The base module 300 may include a driving module 400 and a sound module 500.

The driving module 400 may be disposed under the figure module 10. The driving module 400 may be fastened to the figure module 10, and in more detail, may be fastened to the figure base 180.

The driving module 400 may be embedded into the sound module 500.

The driving module 400 may drive the figure module 10. The driving module 400 may include a controller which controls an overall operation of the figure module 10 and a driving mechanism which operates the figure module 10, and the controller and the driving mechanism may be embedded into the driving module 400.

The sound module 500 may configure an external appearance of the base module 300.

The sound module 500 may include a housing 510, a top cover 512, and a speaker (not illustrated).

The housing 510 may have a box shape where an upper surface thereof is approximately opened. The driving module 400 may be disposed in the housing 510.

The top cover 512 may cover the opened upper surface of the housing 510.

An open hole 513 which an upper portion and a lower portion thereof are opened may be provided in the top cover 512. The figure base 180 may be disposed in the open hole 513. In other words, a size and a shape of the open hole 513 may correspond to the figure base 180. The open hole 513 may have a size which allows the driving module not to pass through the open hole 513.

The speaker may be embedded into the housing 510. A plurality of sound holes 511 through which a sound of the speaker is discharged may be provided in the housing 510.

The FIG. 100 may move according to a sound output from the speaker of the sound module 500. The FIG. 100 may be set to perform an action which differs for each sound output from the speaker.

Figure 7:
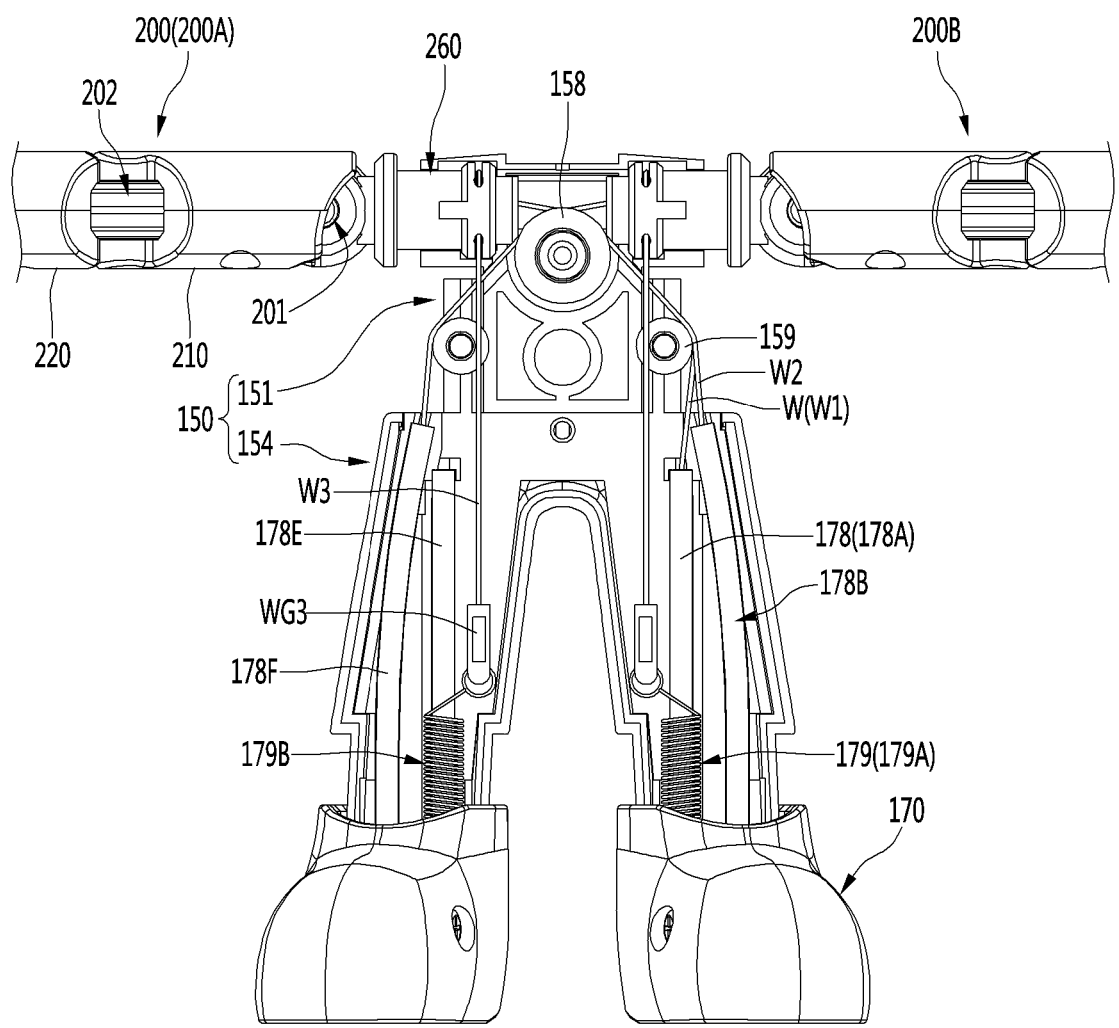
FIG. 7 is a diagram when the inside of a figure according to an embodiment is seen from a front region.
Figure 8:
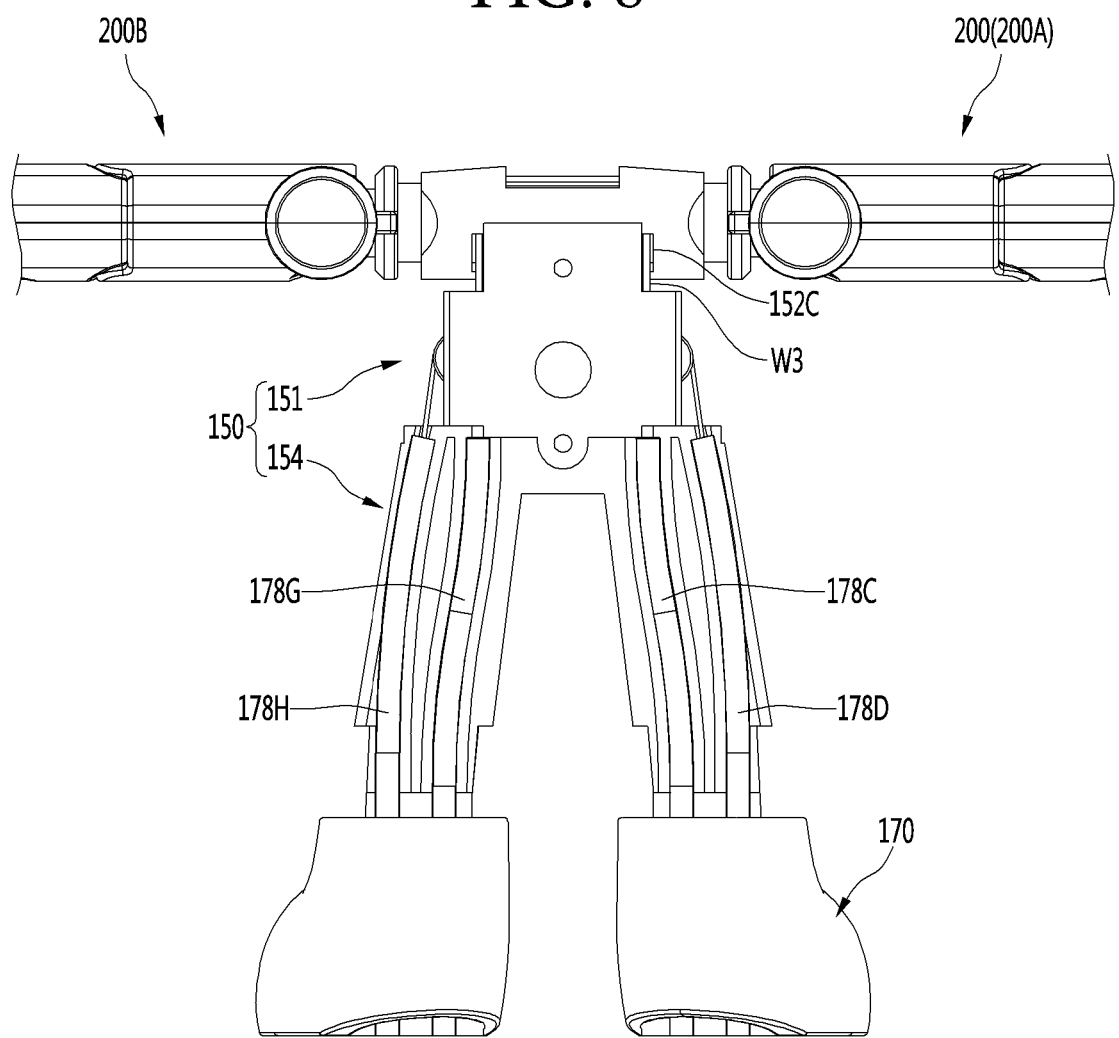
FIG. 8 is a diagram when the inside of a figure according to an embodiment is seen from a rear region.

FIG. 7 is a diagram when the inside of a figure according to an embodiment is seen from a front region, and FIG. 8 is a diagram when the inside of a figure according to an embodiment is seen from a rear region.

The arm assembly 200 may include an upper arm part 210 and a lower arm part 220. Also, the arm assembly 200 may include at least one joint 201 and 202. In more detail, the arm assembly 200 may include a shoulder joint 201 and an elbow joint 202.

Since the arm assembly 200 includes at least one joint 201 and 202, the arm assembly 200 may implement various operations. In other words, the upper arm part 210 and the lower arm part 220 may each be a movable portion which moves by using the joint 201 and 202.

The upper arm part 210 may correspond to a portion between a shoulder and an elbow in an arm of a person. The lower arm part 220 may correspond to a portion between an elbow and a wrist in an arm of a person.

The shoulder joint 201 may rotate the upper arm part 210 with respect to the body 120. The upper arm part 210 may rotate based on the shoulder joint 201 to open or close an armpit.

The elbow joint 202 may rotate the lower arm part 202 with respect to the upper arm part 210. The lower arm part 220 may rotate based on the elbow joint 202 to fold or unfold an elbow.

The arm assembly 200 may further include a connector 260 connected to the body 120. The connector 260 may connect the shoulder joint 201 to the body 120.

The connector 260 may be rotatably connected to the body 120. In other words, the connector 260 may rotate the shoulder joint 201 and the upper arm part 210 with respect to the body 120. In this case, a rotational shaft of the connector 260 may be vertical to a rotational shaft of the shoulder joint 201. In more detail, the rotational shaft of the shoulder joint 201 may be provided long in a forward-rearward direction, and the rotational shaft of the connector 260 may be provided long in a left-right direction.

An operation where a whole portion of the arm assembly 200 rotates based on the connector 260 to turn an arm may be performed.

The right arm assembly 200A and the left arm assembly 200B may have the same configuration.

The FIG. 100 may further include the inner frame 150. The inner frame 150 may be disposed in the body 120.

The inner frame 150 may perform a function of a frame of the FIG. 100.

The inner frame 150 may support the head unit 109 and the arm assembly 200.

The inner frame 150 may include a body frame 151 of which at least a portion is disposed in the upper body 130 and a pair of leg frames 154 of which at least a portion is disposed in the lower body 140 and which is connected to the body frame 151.

The body frame 151 and the leg frame 154 may be provided as one body. However, the present disclosure is not limited thereto.

A lower end of the leg frame 154 may be fastened to the figure base 180. The foot 170 may surround a portion of a lower side of the leg frame 154.

The FIG. 100 may further include a tube 178. The tube 178 may be disposed in the body 120, and in more detail, may be disposed in the lower body 140. The tube 178 may be equipped in the inner frame 150. In more detail, the tube 178 may be equipped in the leg frame 154.

The tube 178 may be disposed long in an upward-downward direction.

The tube 178 may include a flexible material. Therefore, the tube 178 may be easily equipped in the leg frame 154 with being bent. The tube 178 may guide a wire W which drives the FIG. 100. The wire W will be described below in detail.

The tube 178 may be provided in plurality. Each of the plurality of tubes 178 may guide one wire W.

The FIG. 100 may further include an elastic member 179. The elastic member 179 may be disposed in the body 120, and in more detail, may be disposed in the lower body 140. The elastic member 179 may be equipped in the inner frame 150. In more detail, the elastic member 179 may be equipped in the leg frame 154.

The elastic member 179 may be a coil spring. The elastic member 179 may be disposed long in a vertical direction. The elastic member 179 may be disposed to surround a portion of a lower portion of an outer perimeter of the tube 178.

The elastic member 179 may be connected to a wire W3 which rotates the connector 260 of the arm assembly 200. This will be described below in detail.

The FIG. 100 may further include a plurality of wire supporters 158 and 158.

The wire supporters 158 and 159 may support the wire. In more detail, the wire W passing through the tube 178 may contact the wire supporters 158 and 159. Therefore, the wire W may be tightly maintained by a tension.

The wire supporters 158 and 159 may be equipped in the inner frame 150. The wire supporters 158 and 159 may be equipped in a front portion of the inner frame 150.

In more detail, the wire supporters 158 and 159 may be mounted on the body frame 151. The wire supporters 158 and 159 may be fixed to the inner frame 150, or may be rotatably equipped in the inner frame 150.

The wire supporters 158 and 159 may each have an approximately cylindrical hollow shape. The wire supporters 158 and 159 may be provided long in a forward-rearward direction.

The wire supporters 158 and 159 may include a main supporter 158 and a sub-supporter 159. The sub-supporter 159 may be provided as a pair of sub-supporters which are spaced apart from each other in a horizontal direction.

A diameter of the main supporter 158 may be greater than that of the sub-supporter 159.

The main supporter 158 may be disposed more upward from the sub-supporter 159. In other words, a vertical distance from an upper end of the inner frame 150 to the main supporter may be shorter than a vertical distance from an upper end of the inner frame to the sub-supporter.

With respect to a horizontal direction, the main supporter 158 may be provided at a center portion of the inner frame 150, and the sub-supporter 159 may be provided at a side portion of the inner frame 150.

Some of a plurality of tubes 178 may be mounted on the front portion of the leg frame 154, and the other some thereof may be mounted on the rear portion of the leg frame 154.

For example, the plurality of tubes 178 may include a first tube 178A, a second tube 178B, a third tube 178C, a fourth tube 178D, a fifth tube 178E, a sixth tube 178F, a seventh tube 178G, and an eighth tube 178H.

The first tube 178A and the second tube 178B may be disposed on a front surface of one leg frame 154 (for example, a left leg frame). Also, the first tube 178A may be disposed more inward than the second tube 178H.

The third tube 178C and the fourth tube 178D may be disposed on a rear surface of the other leg frame 154 (for example, a right leg frame). Also, the third tube 178C may be disposed more inward than the fourth tube 178D.

The fifth tube 178E and the sixth tube 178F may be disposed on a front surface of the other leg frame 154. Also, the fifth tube 178E may be disposed more inward than the sixth tube 178F.

The seventh tube 178G and the eighth tube 178H may be disposed on a rear surface of the one leg frame 154. Also, the seventh tube 178G may be disposed more inward than the eighth tube 178H.

A rear hole 152C through which the wire W3 for rotating the connector 260 of the arm assembly 200 passes may be provided in the body frame 151. The rear hole 152C may be provided as a pair of rear holes 152C which are spaced apart from each other in a horizontal direction. The pair of rear holes 152C may be disposed at opposite positions with respect to the main supporter 158.

The wire W3 for rotating the connector 260 of the arm assembly 200 may pass through the tube 178 mounted on a rear portion of the leg frame 154, may pass through the rear hole 152C provided in the upper frame 152, and may be inserted into the upper frame 152.

A pair of elastic members 179 may be mounted on the leg frame 154. Hereinafter, a case where the elastic member 179 is disposed in front of the leg frame 154 will be described for example, but the present disclosure is not limited thereto.

An upper end of the elastic member 179 may be connected to the wire W3 which rotates the connector 260 of the arm assembly 200, and a lower end thereof may be fixed to the leg frame 154.

Therefore, when a tension is applied to the wire W3, the wire W3 may upward pull the elastic member 179, and the elastic member 179 may extend. When the tension applied to the wire S3 is removed, the elastic member 179 may be contracted by a restoring force of the elastic member 179 and may downward pull the wire W3.

The pair of elastic members 179 may include a first elastic member 179A mounted on the one leg frame 154 and a second elastic member 179B mounted on the other leg frame 154.

The first elastic member 179A may surround a lower outer perimeter of the first tube 178A, and the second elastic member 179B may surround a lower outer perimeter of the fifth tube 178E.

The first elastic member 179A may be connected to the wire W3 which rotates the connector 260 of one arm assembly 200B, and the second elastic member 179B may be connected to the wire W3 which rotates the connector 260 of the other one arm assembly 200A.

The FIG. 100 may include at least one wire W. A material of the wire W may be changed depending on the case. However, the wire W may include a material having high strength, for minimizing a disconnection of the wire W and enhancing the reliability of a product.

The arm assembly 200 may be connected to the seesaw lever 190 (see FIGS. 9a and 9b) embedded into the figure base 180 by using the wire W passing through the tube 178. The one end portion of the seesaw lever 190 may be lowered and may pull the wire W, thereby driving the FIG. 100.

In more detail, each of the shoulder joint 201 and the elbow joint 202 of the right arm assembly 200A may be connected to the wire W passing through the tube 178 mounted on the left leg frame 154 among the plurality of tubes 178. The left leg frame 154 may be disposed in the left leg 140B (see FIG. 6).

The connector 260 of the right arm assembly 100A may be connected to the wire W passing through the tube 178 mounted on the right leg frame 154 among the plurality of tubes 178. Also, the wire W may be connected to the elastic member 179B mounted on the right leg frame 154. The right leg frame 154 may be disposed in the right leg 140A (see FIG. 6).

Each of the shoulder joint 201 and the elbow joint 202 of the left arm assembly 200B may be connected to the wire W passing through the tube 178 mounted on the right leg frame 154 among the plurality of tubes 178.

The connector 260 of the left arm assembly 100B may be connected to the wire W passing through the tube 178 mounted on the left leg frame 154 among the plurality of tubes 178. Also, the wire W may be connected to the elastic member 179A mounted on the left leg frame 154.

Hereinafter, for convenience of description, the wire W connected to the right arm assembly 200A will be described mainly. Also, since a configuration of the right arm assembly 100A is symmetrical with that of the left arm assembly 1006, those skilled in the art may easily understand a driving method of the left arm assembly 200B.

A first wire W1, a second wire W2, and a third wire W3 may be connected to the arm assembly 200 according to the present embodiment.

The first wire W1 may be connected to the upper arm part 210 or the shoulder joint 201 of the arm assembly 200. The first wire W1 may pull the upper arm part 210 or the first shoulder joint 201 in a direction in which the shoulder joint 201 is bent.

The second wire W2 may be connected to the lower arm part 220 or the elbow joint 202 of the arm assembly 200. The second wire W2 may pull the lower arm part 220 or the elbow joint 202 in a direction in which the elbow joint 202 is bent.

The third wire W3 may be connected to the connector 260 of the arm assembly 200. The third wire W3 may downward pull the connector 260 at a position which is eccentric with respect to a rotational shaft of the connector 260. In other words, the third wire W3 may rotate the connector 260 in one direction or the other direction.

In other words, the first wire W1 and the second wire W2 may rotate the joints 201 and 202. The third wire W3 may rotate the connector 260. Therefore, each of the first and second wires W1 and W3 may be referred to as a joint wire, and the third wire W3 may be referred to as a connector wire.

The first wire W1 may pass through one tube 178 disposed in a leg opposite to the arm assembly 200. The second wire W2 may pass through the other one tube 178 disposed in the leg opposite to the arm assembly 200. The third wire W3 may pass through one tube 178 disposed in a leg disposed at the same side as the arm assembly 200.

In other words, the first wire W1 and the second wire W2 each connected to the right arm assembly 200A may pass through the tube 178 disposed in the left leg frame 154. Also, the third wire W3 connected to the right arm assembly 200A may pass through the tube 178 disposed in the right leg frame 154.

For example, the first wire W1 connected to the right arm assembly 200A may pass through the first tube 178A and may be connected to the shoulder joint 201 or the upper arm part 210. The first wire W1 may be supported in contact with the sub-supporter 157 and the main supporter 158.

The second wire W2 connected to the right arm assembly 200A may pass through the second tube 178H and may be connected to the elbow joint 202 or the lower arm part 220. The second wire W2 may be supported in contact with the sub-supporter 157 and the main supporter 158.

The third wire W3 connected to the right arm assembly 200A may sequentially pass through the third tube 178C and the rear hole 152C, and may be connected to the second elastic member 179B. A portion between the rear hole 152C and the second elastic member 179B may be connected to the connector 260 in a lengthwise direction of the third wire W3.

On the other hand, the first wire W1 and the second wire W2 each connected to the left arm assembly 200B may pass through the tube 178 disposed in the right leg frame 154. Also, the third wire W3 connected to the left arm assembly 200B may pass through the tube 178 disposed in the left leg frame 154.

For example, the first wire W1 connected to the left arm assembly 200B may pass through the sixth tube 178F and may be connected to the shoulder joint 201 or the upper arm part 210. The first wire W1 may be supported in contact with the sub-supporter 157 and the main supporter 158.

The second wire W2 connected to the left arm assembly 200B may pass through the fourth tube 178D and may be connected to the elbow joint 202 or the lower arm part 220. The second wire W2 may be supported in contact with the sub-supporter 157 and the main supporter 158.

The third wire W3 connected to the left arm assembly 200B may sequentially pass through the seventh tube 178G and the rear hole 152C, and may be connected to the first elastic member 179A. A portion between the rear hole 152C and the first elastic member 179A may be connected to the connector 260 in the lengthwise direction of the third wire W3.

The third wire W3 may be connected to the elastic member 179 by a wire connector WG3. However, the third wire W3 may be directly connected to the elastic member 179.

Figure 9A:
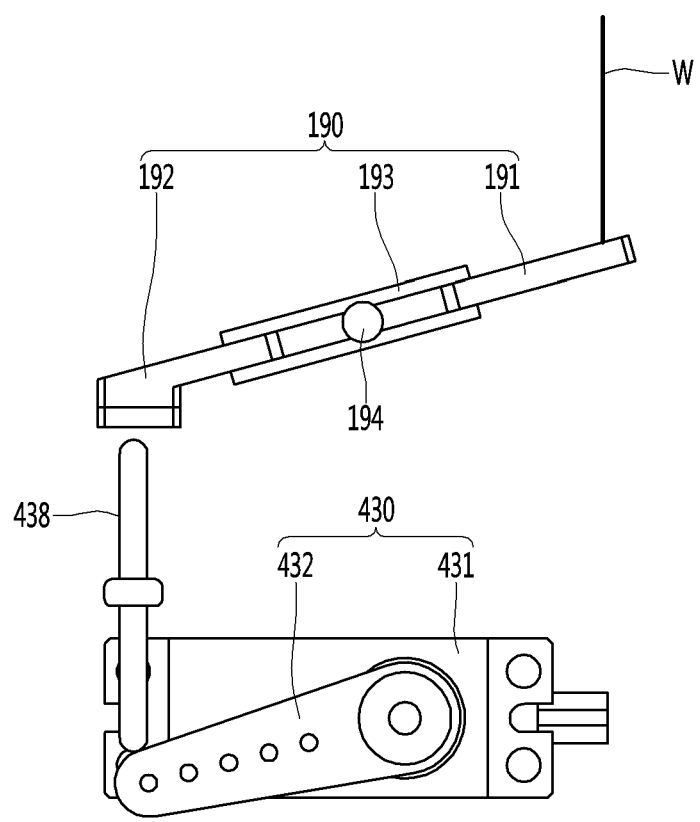
FIGS. 9A and 9B are diagrams for describing an action where a wire according to an embodiment is pulled.
Figure 9B:
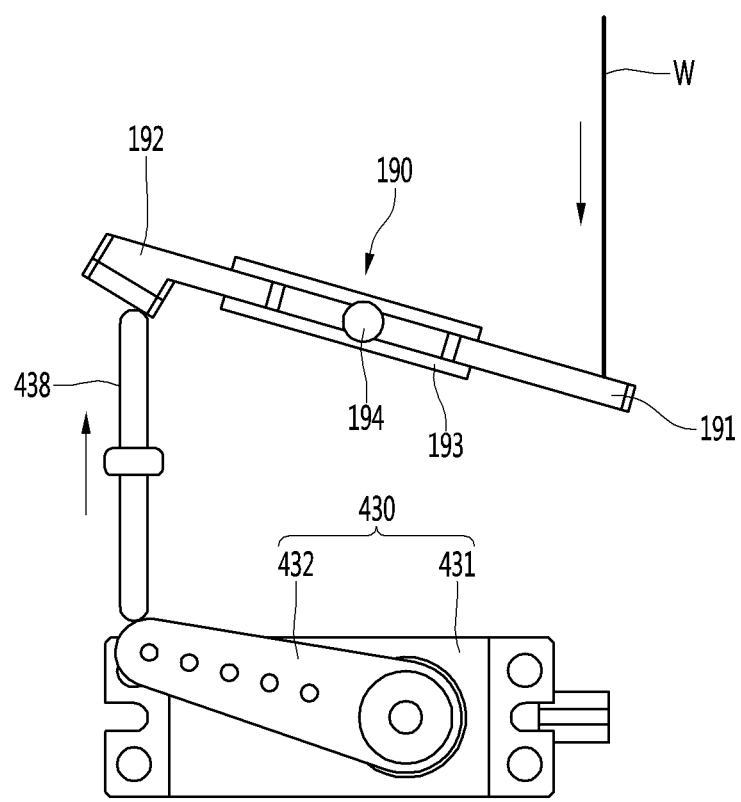

FIGS. 9A and 9B are diagrams for describing an action where a wire according to an embodiment is pulled. In more detail, FIG. 9A is a diagram illustrating a state where a wire is not pulled, and FIG. 9B is a diagram illustrating a state where a wire is pulled downward.

The above-described driving module 400 (see FIG. 5) may include a lifter 430 and a rod 438.

The lifter 430 may be disposed under the figure base 180 (see FIG. 5).

The lifter 430 may raise the rod 438. In more detail, the lifter 430 may include a motor 431 and a lever 432 which is connected to the motor 431 to rotate and to upward pressurize the rod 438.

The rod 438 may be provided long in a vertical direction. A lower end of the rod 438 may be upward pressurized by the lever 432, and an upper end of the rod 438 may be upward pressurized by the seesaw lever 190.

As described above, the seesaw lever 190 may be embedded into the figure base 180 (see FIG. 5).

The seesaw lever 190 may include a first lever plate 191, a second lever plate 192, and a center portion 193.

The wire W may be connected to the first lever 191. The first lever 191 may include one end portion of the seesaw lever 190. The first lever plate 191 may extend in one direction from the center portion 193.

The second lever plate 192 may be pressurized by the rod 438. The second lever 192 may include the other end portion of the seesaw lever 190. The second lever plate 192 may extend from the center portion 193 in a direction opposite to the first lever plate 191.

The center portion 193 may be disposed between the first lever plate 191 and the second lever plate 192. The center portion 193 may connect the first lever plate 191 to the second lever plate 192. A rotational shaft 194 may be provided at the center portion 193. The seesaw lever 190 may rotate about the rotational shaft 194 to operate like seesaw.

When the lifter 430 raises the rod 438, an upper end of the rod 438 may upward pressurize the second lever plate 192, and the seesaw lever 190 may rotate about the rotational shaft. In other words, the second lever plate 192 may be raised, and the first lever plate 191 may be lowered. Therefore, the wire W connected to the first lever plate 191 may be pulled downward.

Figure 10:
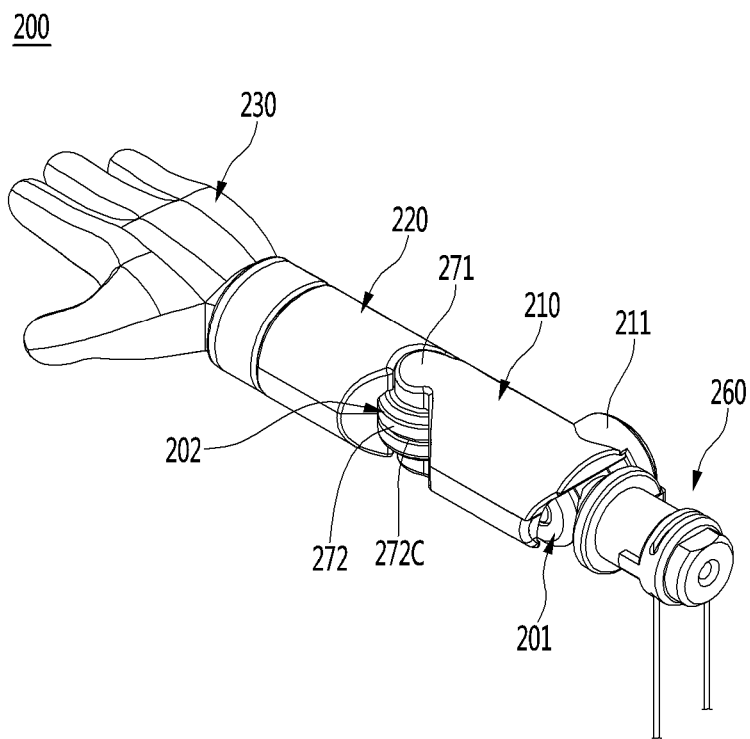
FIG. 10 is a perspective view of an arm assembly according to an embodiment.
Figure 11:
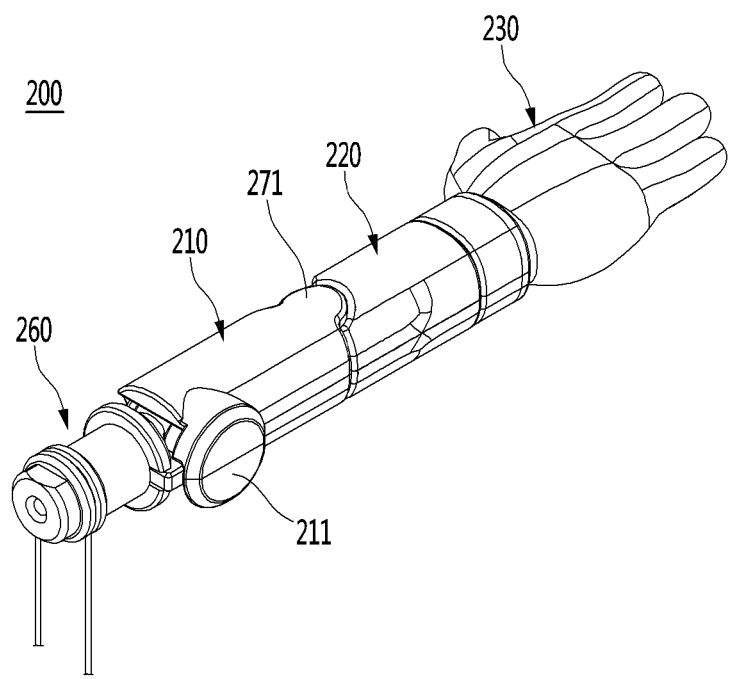
FIG. 11 is a diagram when an arm assembly according to an embodiment is seen from a rear region.
Figure 12:
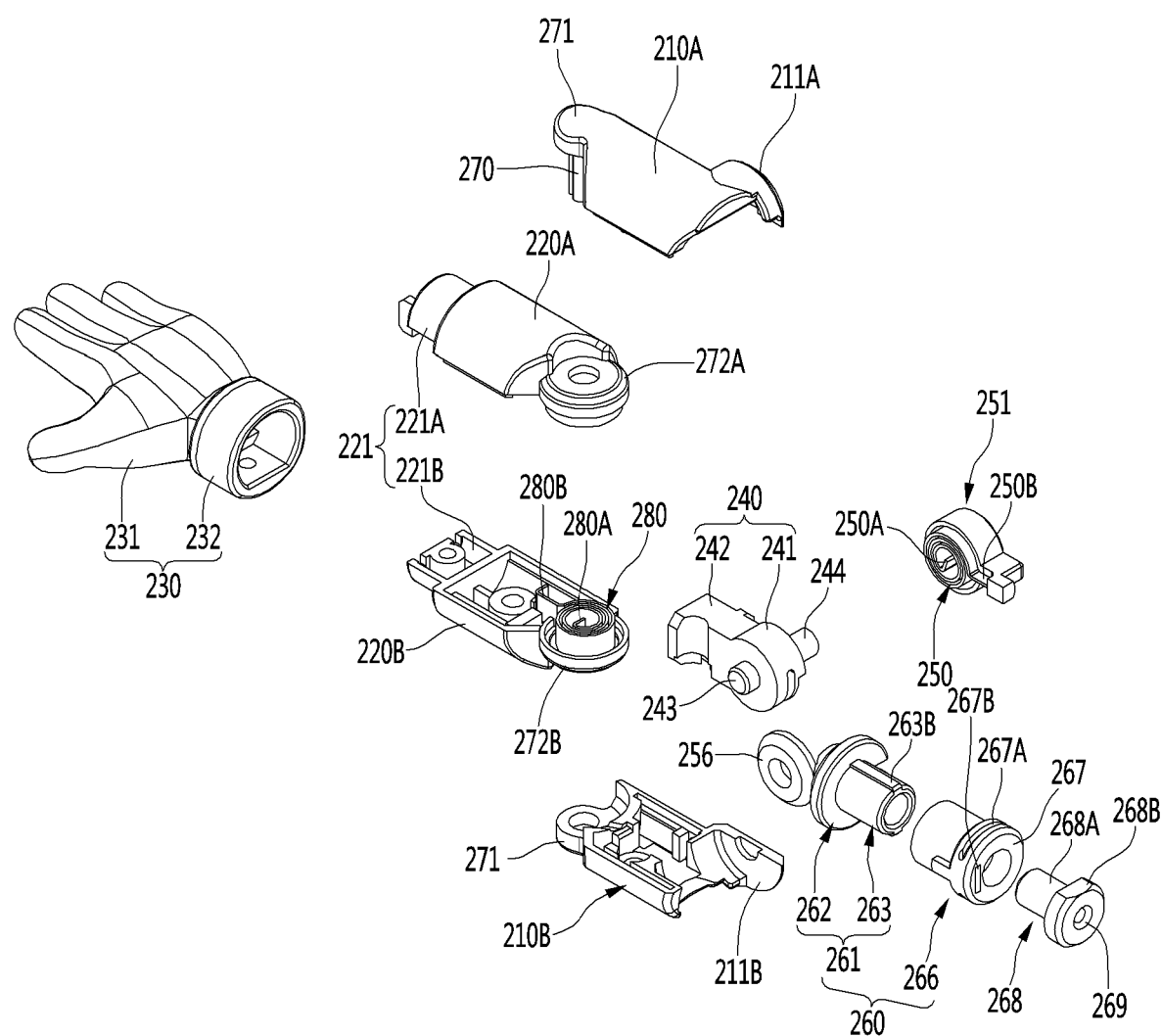
FIG. 12 is an exploded perspective view of an arm assembly according to an embodiment.

FIG. 10 is a perspective view of an arm assembly according to an embodiment, FIG. 11 is a diagram when an arm assembly according to an embodiment is seen from a rear region, and FIG. 12 is an exploded perspective view of an arm assembly according to an embodiment.

An arm assembly 200 may include an upper arm part 210, a lower arm part 220, a hand part 230, a shoulder joint 201, an elbow joint 202, a shoulder elastic member 250, an elbow elastic member 280, and a connector 260.

Considering a case where the FIG. 100 has a shape which is not a shape of a person, the upper arm part 210, the lower arm part 220, the hand part 230, the shoulder joint 201, the elbow joint 202, the shoulder elastic member 250, and the elbow elastic member 280 may be respectively referred to as a first movable portion, a second movable portion, a first joint, a second joint, a first elastic member, and a second elastic member. Also, the connector 260 may be rotatably fastened to a body 120, and thus, may be referred to as a third movable portion.

The upper arm part 210 may correspond to a portion between a shoulder and an elbow in an arm of a person.

The upper arm part 210 may have a circular bar shape which is provided long in approximate one direction.

The upper arm part 210 may include a first upper arm part 210A and a second upper arm part 210B which are detachably fastened to each other. Each of the first upper arm part 210A and the second upper arm part 210B may be provided long in a lengthwise direction of the upper arm part 210.

A cover part 211 which covers a below-described spring accommodating cover 251 may be provided in the upper arm part 210. The cover part 211 may be provided to protrude in a rearward direction from a side end portion of the body 120 (see FIG. 5) of the upper arm part 210.

The cover part 211 may include a first cover part 211A and a second cover part 211B which are detachably fastened to each other. The first cover part 211A may be provided in the first upper arm part 210A, and the second cover part 211B may be provided in the second upper arm part 210B.

The lower arm part 220 may correspond to a portion between an elbow and a wrist in an arm of a person.

The lower arm part 220 may have a circular bar shape which is provided long in approximate one direction.

The lower arm part 220 may include a first lower arm part 220A and a second lower arm part 220B which are detachably fastened to each other. Each of the first lower arm part 220A and the second lower arm part 220B may be provided long in a lengthwise direction of the lower arm part 220.

A hand mounting part 221 with the hand part 230 mounted thereon may be provided in the lower arm part 220. The hand mounting part 221 may be provided at an outer end portion of the lower arm part 220.

The hand part 230 may correspond to a hand and a wrist of a person. In more detail, the hand part 230 may include a hand 231 and a wrist 232 connected to the hand 231.

The wrist 232 may have an approximately hollow cylindrical shape. An external diameter of the wrist 232 may be equal or similar to that of the lower arm part 220.

The hand 231 may be connected to one surface of the wrist 232, and the hand mounting part 221 of the lower arm part 220 may be fastened to an opposite surface. The hand mounting part 221 may be inserted into and fastened to the wrist 232.

The shoulder joint 201 may rotate the upper arm part 210 with respect to the body 120 (see FIG. 5). In more detail, the shoulder joint 201 may rotate the upper arm part 210 with respect to the connector 260.

The upper arm part 210 may rotate based on the shoulder joint 201 to open or close an armpit.

The shoulder joint 201 may include a rotational body 240, a plurality of shoulder joint shafts 243 and 244, a joint shaft supporting part 256, and a spring accommodating cover 251.

The rotational body 240 may be fastened to the upper arm part 210. The rotational body 240 may be disposed between the first upper arm part 210A and the second upper arm part 210B. At least a portion of the rotational body 240 may be embedded into the upper arm part 210. The rotational body 240 may rotate along with the upper arm part 210.

The rotational body 240 may include a rotational part 241 including the shoulder joint shafts 243 and 244 and an upper arm fastening part 242 connected to the rotational part 241 and the upper arm part 210.

The rotational part 241 may have a cylindrical shape which is disposed in an approximately forward-rearward direction. In other words, a diameter of the rotational part 241 may be provided to be round. A front surface and a rear surface of the rotational part 241 may be provided in order for the shoulder joint shafts 243 and 244 to protrude.

The rotational part 241 may be disposed between the joint shaft supporting part 256 and the spring accommodating cover 251 in a forward-rearward direction.

A recessed portion (not illustrated) which is forward recessed may be provided in a rear surface of the rotational part 241, and a portion of the shoulder elastic member 250 may be disposed at the recessed portion.

The upper arm fastening part 242 may be provided in a direction from a perimeter of the rotational part 241 to the lower arm part 220. The upper arm fastening part 242 may be provided as one body with the rotational part 241, but is not limited thereto.

The upper arm fastening part 242 may be fastened to the upper arm part 210. In more detail, the upper arm fastening part 242 may be fitted into and fastened to a portion between the first upper arm part 210A and the second upper arm part 210B.

The shoulder joint shafts 243 and 244 may be provided to forward and rearward protrude from the rotational body 240. The rotational body 240 may rotate about the shoulder joint shafts 243 and 244.

The shoulder joint shafts 243 and 244 may include a first shaft 243 and a second shaft 244.

The first shaft 243 may protrude from one surface of the rotational body 240. In more detail, the first shaft 243 may forward protrude from a front surface of the rotational part 241. The first shaft 243 may be connected to and supported by the joint shaft supporting part 256.

The second shaft 244 may protrude from the other surface of the rotational body 240. In more detail, the second shaft 244 may rearward protrude from a rear surface of the rotational part 241. In more detail, the second shaft 244 may rearward protrude from the inside of the recessed portion provided in the rear surface of the rotational part 241. The second shaft 244 may be connected to the shoulder elastic member 250 and may be supported by the spring accommodating cover 251.

The joint shaft supporting part 256 may have an approximately circular ring shape. The joint shaft supporting part 256 may rotatably support the shoulder joint shafts 243 and 244 at one side of the rotational body 240.

The joint shaft supporting part 256 may be disposed in front of the rotational body 240 (in more detail, the rotational part 241). The first shaft 243 may be inserted into the joint shaft supporting part 256.

The joint shaft supporting part 256 may be provided as one body with a first connecting body 261. However, the present embodiment is not limited thereto, and the joint shaft supporting part 256 may be fastened to the first connecting body 261.

The shoulder elastic member 250 may provide an elastic force in a direction in which the shoulder joint 201 is opened.

The shoulder elastic member 250 may be disposed behind the rotational body 240 (in more detail, the rotational part 241). The first shaft 243 may be inserted into the joint shaft supporting part 256. The shoulder elastic member 250 may be connected to the shoulder joint shafts 243 and 244, and in more detail, may be connected to the second shaft 244.

The shoulder elastic member 250 may be a spiral spring. In this case, an inner end portion 250A of the shoulder elastic member 250 may be connected to the shoulder joint shafts 243 and 244. Also, an outer end portion 250B of the shoulder elastic member 250 may be fixed to at least one of the spring accommodating cover 251 and the first connecting body 261. The inner end portion 250A may be disposed at a center portion of a spiral shape, and the outer end portion 250B may be provided to outward protrude from a spiral shape.

The shoulder elastic member 250 may be embedded into the spring accommodating cover 251.

The spring accommodating cover 251 may rotatably support the shoulder joint shafts 243 and 244 at the other side of the rotational body 240.

In more detail, the spring accommodating cover 251 may rotatably support the second shaft 244. The spring accommodating cover 251 may be disposed behind the rotational body 240 (in more detail, the rotational part 241). The spring accommodating cover 251 may cover the shoulder elastic member 250 from a rear region and may support the shoulder joint shafts 243 and 244.

The elbow joint 202 may rotate the lower arm part 220 with respect to the upper arm part 210. The lower arm part 220 may rotate based on the elbow joint 202 to fold or unfold an elbow.

The elbow joint 202 may include an outer joint part 271, an inner joint part 272, and an elbow joint shaft 270.

The outer joint part 271 may be provided in one of the upper arm part 210 and the lower arm part 220, and the inner joint part 272 may be provided in the other of the upper arm part 210 and the lower arm part 220. Hereinafter, a case where the outer joint part 271 is provided in the upper arm part 210 and the inner joint part 272 is provided in the lower arm part 220 will be described for example.

The outer joint part 271 may be provided at a side end portion of the lower arm part 220 among both end portions of the upper arm part 210. The outer joint part 271 may be provided as one body with the upper arm part 210, but is not limited thereto.

The outer joint part 271 may have a discal shape which is provided to be outward convex.

The outer joint part 271 may be provided in a pair of outer joint parts 271 which are spaced apart from each other. In more detail, one of the pair of outer joint parts 271 may be provided in the first upper arm part 210A, and the other may be provided in the second upper arm part 210B.

The inner joint part 272 may be provided at a side end portion of the upper arm part 210 among both end portions of the lower arm part 220. The inner joint part 272 may be provided as one body with the lower arm part 220, but is not limited thereto.

The inner joint part 272 may have an approximately circular ring or hollow cylindrical shape.

The inner joint part 272 may be disposed between the pair of outer joint parts 271.

The inner joint part 272 may include a first inner joint part 272A and a second inner joint part 272B which are detachably fastened to each other. In more detail, the pair of inner joint parts 272 may include a first inner joint part 272A provided in the first lower arm part 220A and a second inner joint part 272B provided in the second lower arm part 220B.

The elbow joint shaft 270 may pass through the inner joint part 272 and may connect the pair of outer joint parts 271.

The elbow joint shaft 270 may be provided to protrude from one of the pair of outer joint parts 271 to the other thereof. The lower arm part 220 and the inner joint part 272 connected thereto may rotate about the elbow joint shaft 270.

The elbow elastic member 280 may provide an elastic force in a direction in which the elbow joint 202 is opened.

The elbow elastic member 280 may be embedded into the inner joint part 272. In other words, the elbow elastic member 280 may be disposed between the first inner joint part 272A and the second inner joint part 272B.

The elbow elastic member 280 may be connected to the elbow joint shaft 270.

The elbow elastic member 280 may be a spiral spring. In this case, an inner end portion 280A of the elbow elastic member 280 may be connected to the elbow joint shaft 270. Also, an outer end portion 280B of the elbow elastic member 280 may be fixed to the lower arm part 220. The inner end portion 280A may be disposed at a center portion of a spiral shape, and the inner end portion 280B may be provided to outward protrude from a spiral shape.

The connector 260 may rotatably connect the arm assembly 200 to the body 120 (see FIG. 5). The connector 260 may be connected to at least one of the shoulder joint 202 or the upper arm part 210. An action where the arm assembly 200 turns an arm or forward or rearward stretches out the arm while rotating wholly may be performed based on the connector 260.

The connector 260 may include a first connecting body 261 and a second connecting body 266 connected to the first connecting body 261.

The first connecting body 261 may be connected to at least one of the shoulder joint 202 and the upper arm part 210. The above-described joint shaft supporting part 256 may be included in the first connecting body 261.

In more detail, the first connecting body 261 may include a first part 261 and a second part 263 which is connected to the first part 262 and is fastened to the second connecting body 266.

One surface of the first part 262 may face the upper arm part 210, and the other surface thereof may face the body 120. The one surface of the first part 262 may be connected to the joint shaft supporting part 256, and the other surface thereof may be connected to the second part 263.

The second part 263 may have an approximately hollow cylindrical shape. The second part 263 may protrude in a direction from the first part 262 to the body 120. The second part 263 may be provided as one body with the first part 262, but is not limited thereto.

An anti-rotation part 263B for preventing a relative rotation from occurring between the second part 263 and the second connecting body 266 may be provided on an outer surface of the second part 263. The anti-rotation part 263B may be provided to protrude a radius outward direction from an outer perimeter of the second part 263.

An anti-rotation groove (not illustrated) into which the anti-rotation part 263B is inserted may be provided in an inner surface of the second connecting body 266. Therefore, the second connecting body 266 and the first connecting body 261 may rotate together.

The second connecting body 266 may have an approximately hollow cylindrical shape. The second connecting body 266 may be fastened to the second part 263 of the first connecting body 261. The second part 263 may be inserted into the second connecting body 266, and thus, may be fastened thereto.

A large diameter part 267 may be provided in the connector 260 (in more detail, the second connecting body 266). The large diameter part 267 may extend in a radius outward direction from an outer perimeter of the second connecting body 266. The large diameter part 267 may be provided at a side end portion of the body 120 (see FIG. 5) of the second connecting body 266.

A wire groove 267A which is provided long in a perimeter direction of the large diameter part 267 may be provided in the large diameter part 267. The above-described third wire W3 may be hung on the wire groove 267A.

Moreover, a fixing groove 267B which communicates with the wire groove 267A and through which the third wire W3 passes may be provided in one surface of the second connecting body 266. The one surface may be a surface facing the body 120.

The arm assembly 200 may further include a fastening member 268 fastened to the connector 260.

The fastening member 2268 may be fastened to the second connecting body 266. The fastening member 268 may prevent the third wire W3 from slipping with respect to the connector 260. Also, the fastening member 268 may fasten the second connecting body 266 to the first connecting body 261.

The fastening member 268 may include a body part 268A fastened to the second connecting body 268 and a head part 268B which is connected to the body part 268A and contacts the one surface of the second connecting body 266.

The head part 268B of the fastening member 268 may contact the one surface of the second connecting body 266 and may pressurize the wire W3 passing through the fixing groove 267B. Therefore, slip may not occur between the third wire W3 and the connector 260, and the third wire W3 may smoothly rotate the connector 260.

A wire path 269 through which the wire W passes may be provided in the fastening member 268. The wire path 269 may long pass through a region from the head part 268B to the body part 268B. In other words, the wire path 269 may be provided long in a lengthwise direction of the fastening member 268.

The wire path 269 may communicate with a hollow portion of the connector 260. The above-described first and second wires W1 and W2 may pass through the wire path 269 and the hollow portion of the connector 260 and may respectively pull the upper arm part 210 and the lower arm part 220. Therefore, the fastening member 268 may be referred to as a wire guide.

The fastening member 268 may be referred to as a wire guide.

Figure 13:
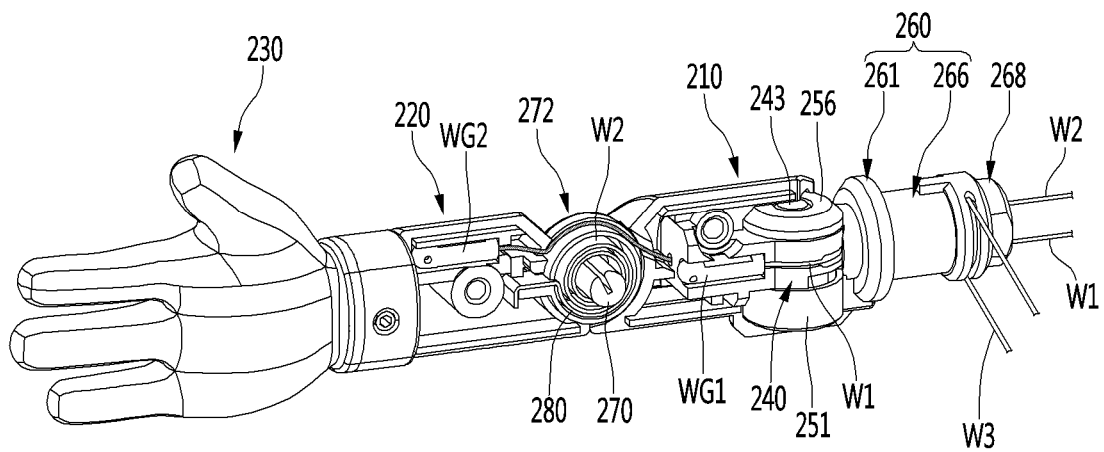
FIG. 13 is a diagram illustrating the inside of an arm assembly according to an embodiment.
Figure 14:
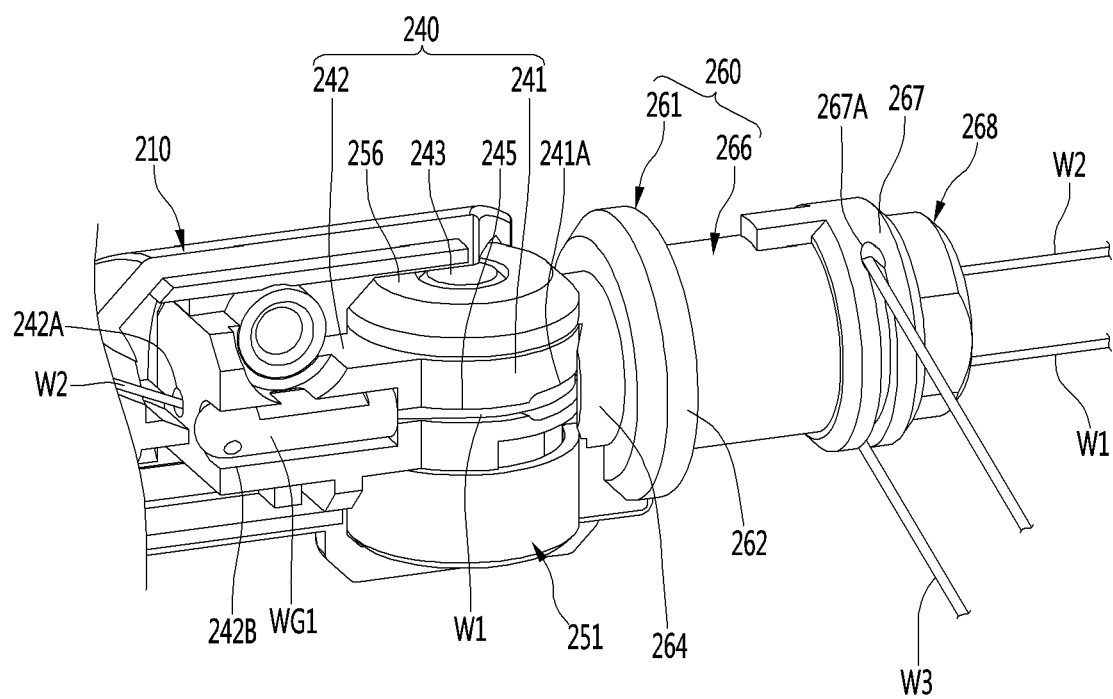
FIG. 14 is an enlarged view of a periphery of a first wire fixing member of the arm assembly illustrated in FIG. 13.
Figure 15:
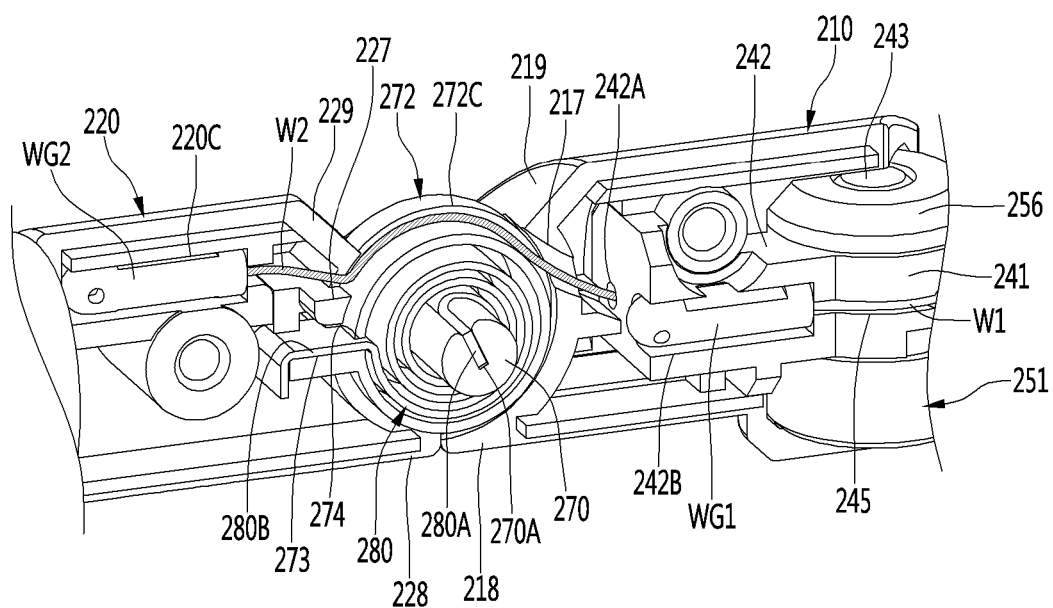
FIG. 15 is an enlarged view of a periphery of a second wire fixing member of the arm assembly illustrated in FIG. 13.
Figure 16:
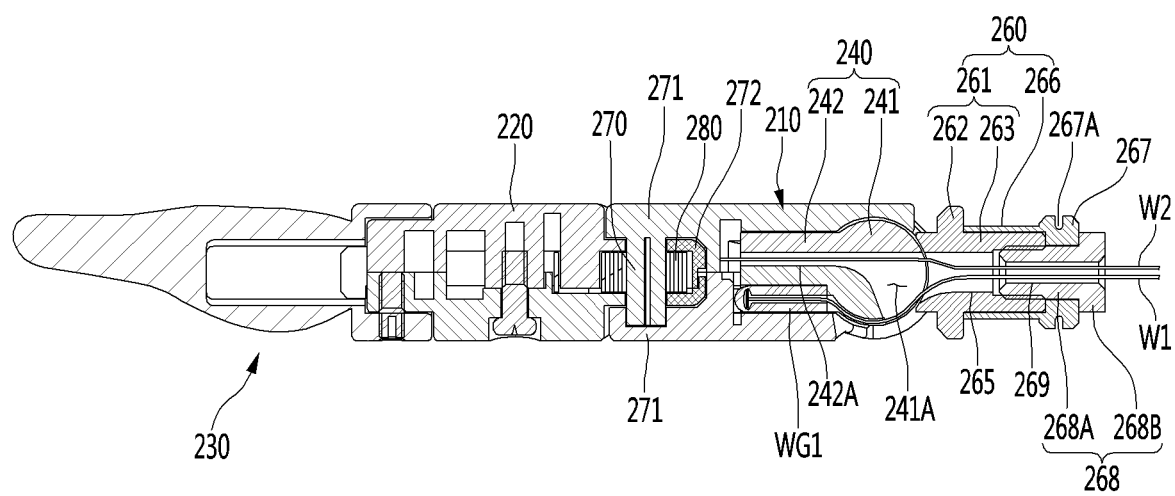
FIG. 16 is a cross-sectional view when an arm assembly according to an embodiment is cut in a direction vertical to a rotational shaft of a shoulder joint.
Figure 17:
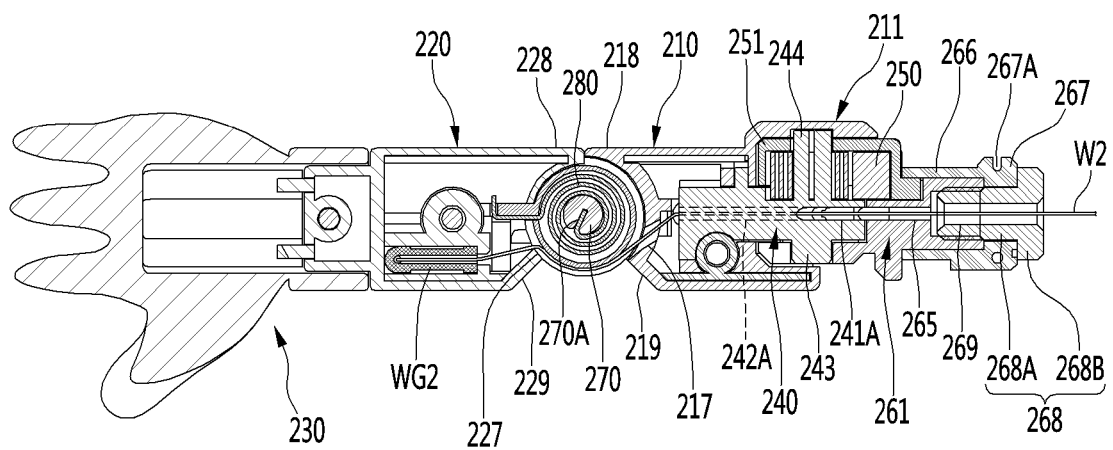
FIG. 17 is a cross-sectional view when an arm assembly according to an embodiment is cut in a direction vertical to a rotational shaft of an elbow joint.

FIG. 13 is a diagram illustrating the inside of an arm assembly according to an embodiment, FIG. 14 is an enlarged view of a periphery of a first wire fixing member of the arm assembly illustrated in FIG. 13, FIG. 15 is an enlarged view of a periphery of a second wire fixing member of the arm assembly illustrated in FIG. 13, FIG. 16 is a cross-sectional view when an arm assembly according to an embodiment is cut in a direction vertical to a rotational shaft of a shoulder joint, and FIG. 17 is a cross-sectional view when an arm assembly according to an embodiment is cut in a direction vertical to a rotational shaft of an elbow joint.

Referring to FIGS. 16 and 17, a rotational shaft of a connector 260 may be vertical to a rotational shaft of a shoulder joint 201 and a rotational shaft of an elbow joint 202. For example, the rotational shaft of the connector 260 may be provided long in a horizontal direction, the rotational shaft of the shoulder joint 201 may be provided long in a forward-rearward direction, and the rotational shaft of the elbow joint 202 may be provided long in a vertical direction.

A first wire W1 and a second wire W2 may be inserted into an arm assembly 200 through a wire path 269 in a body 120 (see FIG. 5).

The wire path 269 may be provided in a fastening member 268. The wire path 269 may be a circular hollow portion which is provided long in a lengthwise direction of the fastening member 268.

A hollow portion 265 communicating with the wire path 269 may be provided in the connector 260. In more detail, the hollow portion 265 may be provided in a first connecting body 261.

A wire avoidance groove 241A and a wire guide hole 242A each communicating with the hollow portion 265 may be provided in a rotational body 240 of a shoulder joint 201.

The wire avoidance groove 241A may be formed as a portion of a perimeter surface of a rotational part 241 is recessed inward. The wire avoidance groove 241A may be formed so that interference does not occur between the second wire W2 and the rotational body 240 when the rotational body 240 rotates. The wire avoidance groove 241A may be provided at a position corresponding to an armpit of a human body.

The wire guide hole 242A may communicate with the wire avoidance groove 241A. The wire guide hole 242A may be provided to pass through a region from the wire avoidance groove 241A to an end portion of an upper arm fastening part 242.

The first wire W1 and the second wire W2 may sequentially pass through the wire path 269 and the hollow portion 265.

The first wire W1 may be connected to a first wire connector WG1 mounted on an upper arm part 210 or the rotational body 240. For example, a mounting groove 242B (see FIG. 14) with the first wire connector WG1 mounted thereon may be provided in a lower portion of an upper arm fastening part 242 of the rotational body 240. The upper arm part 210 may cover the first wire connector WG1 at a lower side.

A first wire guide groove 245 (see FIG. 14) may be provided in an outer surface of the rotational body 240. The first wire guide groove 245 may be provided in a lower surface of the rotational body 240. The first wire guide groove 245 may communicate with the wire avoidance groove 241A. The first wire guide groove 245 may guide the first wire W1, passing through the wire path 269 and the hollow portion 265, to the first wire connector WG1.

When a shoulder joint 201 rotates in a bent direction with a tension of the first wire W1, a shoulder elastic member 250 may be elastically deformed. In more detail, an outer end portion 250B (see FIG. 12) of the shoulder elastic member 250 which is a spiral spring may be maintained with being fixed to at least one of the connector 260 and a spring accommodating cover 251, and an inner end portion 250A thereof may rotate along with the upper arm part 210 with being fitted into a groove 244A provided in a second shaft 244.

When the tension of the first wire W1 is removed, the shoulder joint 201 may be opened by a restoring force of the shoulder elastic member 250.

The upper arm part 210 may include a first limiter 218, and a lower arm part 220 may include a second limiter 228. The first limiter 218 and the second limiter 228 may limit a rotational range of an elbow joint 202.

The first limiter 218 may configure a portion of a side end portion of an elbow joint 202 of the upper arm part 210. The second limiter 228 may configure a portion of a side end portion of an elbow joint 202 of the lower arm part 210.

The first limiter 218 and the second limiter 228 may be disposed outside the elbow joint 202 in a direction in which the elbow joint 202 is bent.

When the elbow joint 202 is bent, the first limiter 218 and the second limiter 228 may be apart from each other. On the other hand, when the elbow joint 202 is fully opened, the first limiter 218 and the second limiter 228 may contact each other. Therefore, like an elbow of a person, a movable range of the elbow joint 202 may be limited.

The upper arm part 210 may include an upper arm inclined portion 219, and the lower arm part 220 may include a lower arm inclined portion 229. The upper arm inclined portion 219 and the lower arm inclined portion 229 may be apart from each other.

The upper arm inclined portion 219 may be provided to be inclined in a direction from an outer perimeter of the upper arm part 210 to an outer perimeter of an inner joint part 272. The lower arm inclined portion 229 may be provided to be inclined in a direction from an outer perimeter of the lower arm part 220 to the outer perimeter of the inner joint part 272.

The upper arm inclined portion 219 may configure a portion of a side end portion of the elbow joint 202 of the upper arm part 210. The lower arm inclined portion 229 may configure a portion of a side end portion of the elbow joint 202 of the lower arm part 220.

Moreover, the upper arm inclined portion 219 and the lower arm inclined portion 229 may be disposed inward from the elbow joint 202 in a direction in which the elbow joint 202 is bent. Therefore, when the elbow joint 202 is bent, the upper arm inclined portion 219 and the lower arm inclined portion 229 may become closer to each other.

Referring to FIG. 15, a second wire guide groove 272C which guides the second wire W2 may be provided in the elbow joint 202.

The second wire guide groove 272C may be provided in an outer perimeter of the inner joint part 272. The second wire guide groove 272C may be provided long in a perimeter direction of the inner joint 272. The second wire guide groove 272C may face a portion between the upper arm inclined portion 219 and the lower arm inclined portion 229. In other words, the second wire guide groove 272C may be provided at a portion between the upper arm inclined portion 219 and the lower arm inclined portion 229 in the outer perimeter of the inner joint 272.

A first open groove 217 may be provided in the upper arm part 210, and a second open groove 227 may be provided in the lower arm part 220. The first open groove 217 may communicate the wire guide hole 242A with the second wire guide groove 272C. The second open groove 227 may communicate the second wire guide groove 272C with a mounting groove 220C with a second wire connector WG2 mounted thereon.

In other words, the second wire W2 passing through the wire guide hole 242A may sequentially pass through the first open groove 217, the second wire guide groove 272C, and the second open groove 227 and may be connected to the second wire connector WG2.

The first open groove 217 may be provided between the outer perimeter of the inner joint part 272 and the first inclined part 219. The second open groove 227 may be provided between the outer perimeter of the inner joint part 272 and the second inclined part 229.

The mounting groove 220C (see FIG. 15) with the second wire connector WG2 mounted thereon may be provided in the lower arm part 220.

Also, a spring fitting groove 274 through which an outer end portion 280B of the elbow elastic member 280 may be provided in the inner joint part 272. An elbow elastic member pressurizer 273 which pressurizes the outer end portion 280B of the elbow elastic member 280 in a rotational direction of the lower arm part 220 may be provided in the lower arm part 220.

When an elbow joint 202 rotates in a bent direction with a tension of the second wire W2, an elbow elastic member 280 may be elastically deformed. In more detail, an inner end portion 280A (see FIG. 15) of the elbow elastic member 280 may be maintained with being fitted into and fixed to a groove 270A provided in the elbow joint shaft 270, and an outer end portion 280B thereof may be pressurized by the elbow elastic member pressurizer 272 and may rotate along with the lower arm part 220 with being fitted into a spring fitting groove 273 provided in the lower arm part 220.

When the tension of the second wire W2 is removed, the elbow joint 202 may be opened by a restoring force of the elbow elastic member 280.

A wire groove 267A may be provided in an outer perimeter of the connector 260. In more detail, the wire groove 267A may be provided in an outer perimeter of the second connecting body 266. The wire groove 267A may be disposed in the body 120 (see FIG. 5).

The wire groove 267A may be provided long in a perimeter direction of the connector 260. In other words, the wire groove 267A may have a circular ring shape.

A third wire W3 may be fitted into the wire groove 267A. The third wire W3 may surround an approximately half of an upper portion of a perimeter of the wire groove 267A.

When the third wire W3 is pulled downward, the connector 260 may rotate with respect to the body 120 (see FIG. 5).

The third wire W3 may be connected to an elastic member 179 (see FIG. 7). In more detail, the third wire W3 may be connected to a third wire connector WG3, and the third wire connector WG3 may be connected to the elastic member 179. Also, the third wire W3 may be directly connected to the elastic member 179.

Hereinafter, an action of the arm assembly 200 will be described.

When the first wire W1 is pulled by a seesaw lever 190 (see FIGS. 9A and 9B), the first wire W1 may pull the upper arm part 210 or the shoulder joint 201, and the upper arm part 210 and the shoulder joint 201 may rotate and may be bent with respect to the connector 260. In this case, an inner end portion 250A of the shoulder elastic member 250 may rotate, and an outer end portion 250B thereof may be fixed, whereby the shoulder elastic member 250 may be elastically deformed.

When the seesaw lever 190 does not pull the first wire W1, the upper arm part 110 and the shoulder joint 201 may rotate based on a restoring force of the shoulder elastic member 250, and thus, may be opened with respect to the connector 260.

When the second wire W2 is pulled by the seesaw lever 190 (see FIGS. 9A and 9B), the second wire W2 may pull the lower arm part 220 or the elbow joint 202, and the lower arm part 220 and the shoulder joint 202 may rotate and may be bent with respect to the upper arm part 210. In this case, an inner end portion 280A of the elbow elastic member 280 may be fixed, and an outer end portion 280A thereof may rotate, whereby the elbow elastic member 280 may be elastically deformed.

When the seesaw lever 190 does not pull the second wire W2, the lower arm part 210 and the elbow joint 202 may rotate based on a restoring force of the elbow elastic member 280, and thus, may be opened with respect to the upper arm part 210.

When the third wire W3 is pulled by the seesaw lever 190 (see FIGS. 9A and 9B), the third wire W3 may rotate the connector 260 in one direction (for example, rearward rotation) with respect to the body 120. In this case, the elastic member (see FIG. 9) may be elastically deformed and may extend.

When the seesaw lever 190 does not pull the third wire W3, the elastic member 179 may be compressed by a restoring force and may pull the third wire W3. Therefore, the third wire W3 may rotate the connector 260 in an opposite direction (for example, forward rotation) with respect to the body 120.

Figure 18:
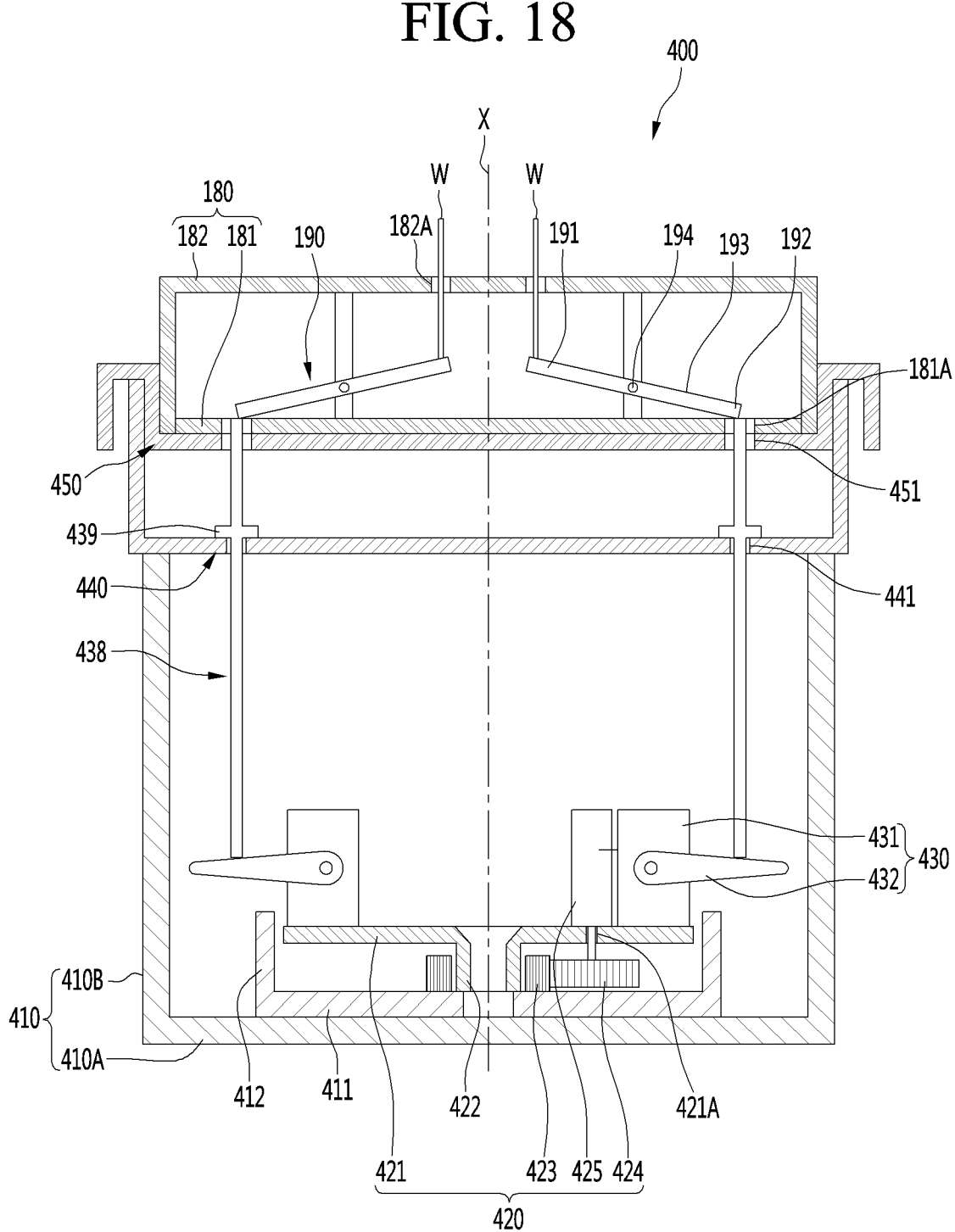
FIG. 18 is a sectional view illustrating the inside of the figure base and the drive module according to an embodiment of the present disclosure.
Figure 19:
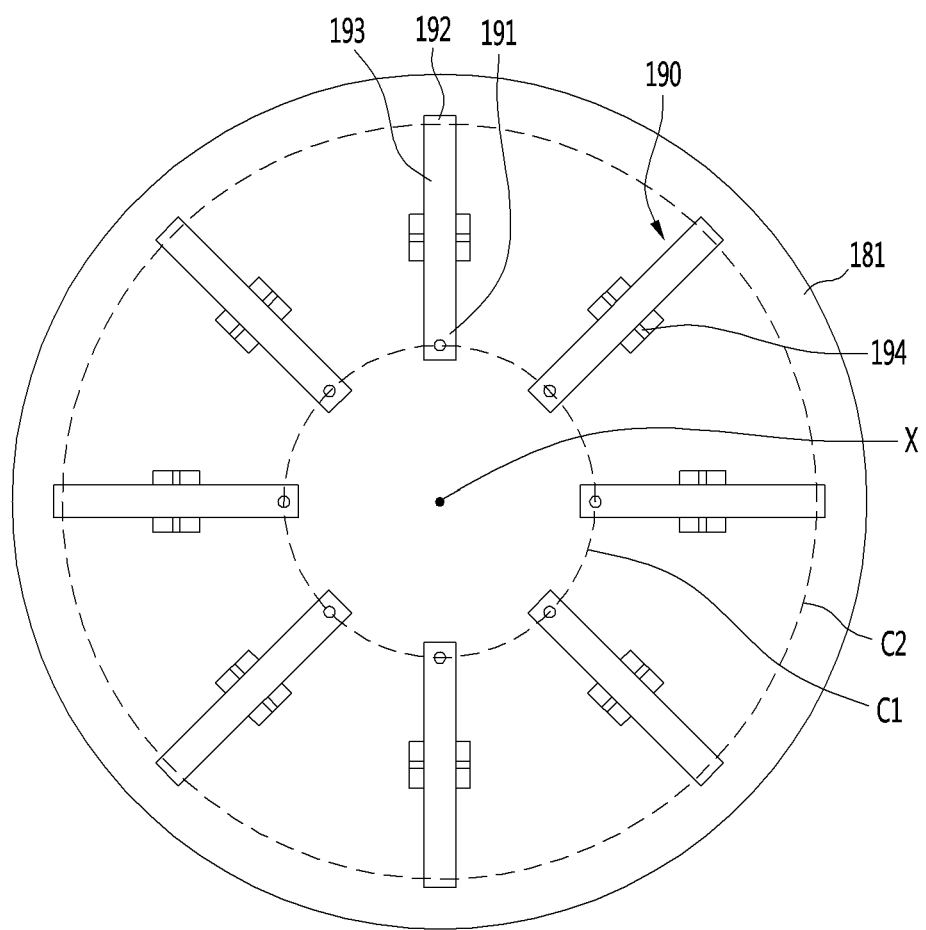
FIG. 19 is a view illustrating the inside of the figure base illustrated in FIG. 18 as viewed from above.
Figure 20:
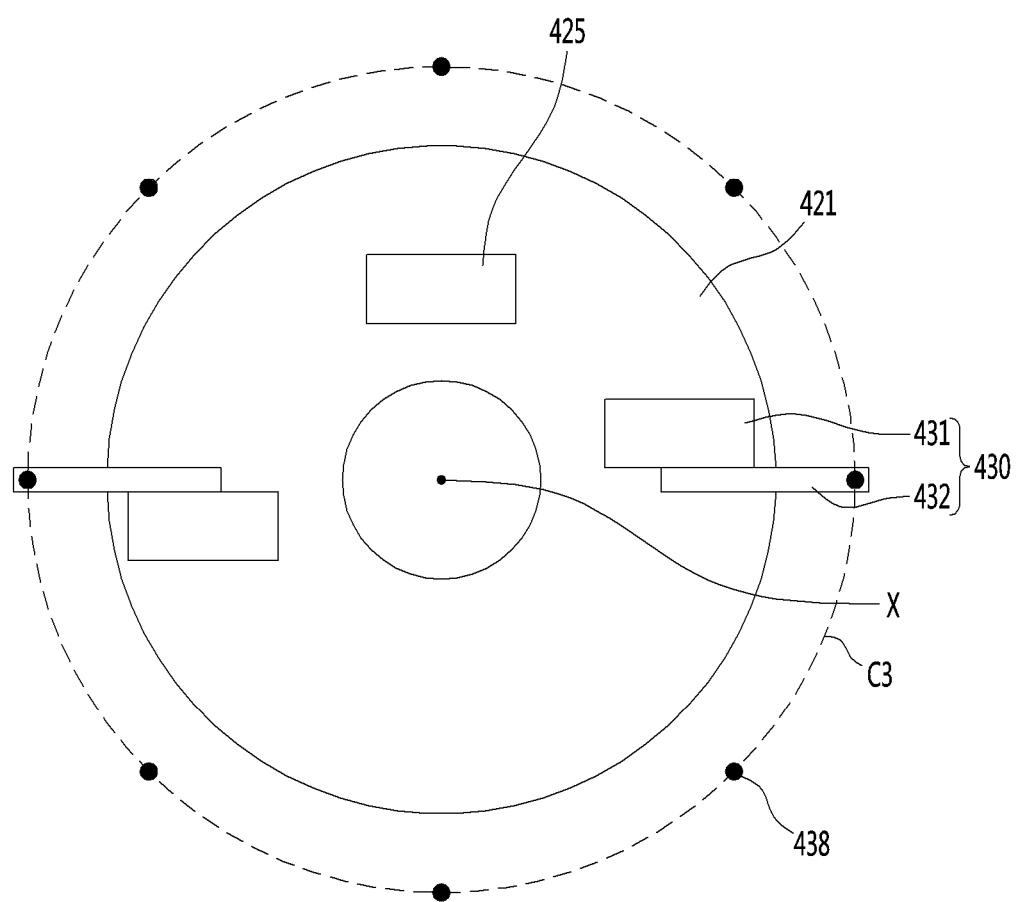
FIG. 20 is a view illustrating the revolution mechanism illustrated in FIG. 18 as viewed from above.

FIG. 18 is a sectional view illustrating the inside of the figure base and the drive module according to an embodiment of the present disclosure, FIG. 19 is a view illustrating the inside of the figure base illustrated in FIG. 18 as viewed from above, and FIG. 20 is a view illustrating the revolution mechanism illustrated in FIG. 18 as viewed from above;

The figure base 180 may include a lower plate 181 and a base cover 182.

The lower plate 181 may have an approximately discal shape. The lower plate 181 may configure a lower surface of the figure base 180.

The base cover 182 may include an internal space provided therein, and the lower surface thereof may be open. The base cover 182 may cover the lower plate 181 at a lower side. The base cover 182 may configure a perimeter surface and an upper surface of the figure base 180.

The plurality of seesaw lever 190 may be embedded into the figure base 180. The seesaw lever 190 may be disposed on the lower plate 181 and may be covered by the base cover 182.

Each of each seesaw lever 190 may operate like seesaw. In other words, when one end portion of the seesaw lever 190 is lowered, the other end portion thereof may be raised, and when the one end portion of the seesaw lever 190 is raised, the other end portion thereof may be lowered.

The wire W may be connected to the one end portion of the seesaw lever 190. The other end portion of the seesaw lever 190 may be raised by the above-described rod 438. Therefore, the one end portion of the seesaw lever 190 connected to the wire W may be lowered and may pull the wire W, thereby driving the FIG. 100.

A wire through hole 182A through which the wire W connected to the one end portion of the seesaw lever 190 passes may be provided in the upper surface of the base cover 182.

The wire W connected to the seesaw lever 190 may extend to the inside of the tube 178 which passes through the wire through hole 182A and is mounted on the inner frame 150.

The wire through hole 182A may be formed to penetrate the upper surface of the base cover 182 in the vertical direction. A plurality of wire through holes 182A may be formed. Each wire W may pass through a different wire through hole 182A from each other.

The lower plate 181 of the figure base 180 may have a rod through hole 181A through which the rod 439 of the driving module 400 passes. The rod 438 may press the second lever portion 192 of the seesaw lever 190 upward through the rod through hole 181A.

The rod through hole 181A may be formed to penetrate the lower plate 181 in the vertical direction. A plurality of rod through holes 181A may be formed. Each rod 439 may pass through different rod through holes 181A from each other.

The plurality of rod through holes 181A may be adjacent to the outer circumference of the figure base 180. In other words, the plurality of rod through holes 181A may be formed adjacent to the edge of the lower plate 181.

The second lever plate 192 of each seesaw lever 190 may be located in the rod through hole 181A or above the rod through hole 181A.

The inside of the figure base 180 may be provided with a rotation shaft supporter 189 supporting the rotation shaft 194 of the seesaw lever 190. The rotation shaft supporter 189 may be fixed to at least one of the lower plate 181 or the base cover 182.

The rotary shaft supporter 189 may have an insertion hole into which both ends of the rotary shaft 194 are inserted. The rotation shaft 194 may rotate with both ends inserted into the insertion hole. In other words, the rotation shaft supporter 189 may rotatably support the rotation shaft 194.

Meanwhile, referring to FIG. 18, the seesaw lever 190 may be disposed to be long in the radial direction of the figure base 180. In addition, the plurality of seesaw levers 190 may be spaced apart from each other in the circumferential direction of the figure base 190. Preferably, the plurality of seesaw levers 190 may be spaced apart from each other in the circumferential direction of the figure base 190 by a predetermined interval.

The second lever portion 192 may be located outside the first lever portion 191 with respect to the radial direction of the figure base 180. Accordingly, the first lever portion 191 may include an inner end portion of the seesaw lever 190, and the second lever plate 192 may include an outer end portion of the seesaw lever 190.

Inner end portions of the plurality of seesaw levers 190 may be positioned on a first virtual circle C1. The outer end portions of the plurality of seesaw levers 190 may be located on a second virtual circle C2 having a larger diameter than the first virtual circle C1. The centers of the first virtual circle C1 and the second virtual circle C2 may be positioned on the virtual vertical axis X passing through the center of the figure base 180.

Therefore, the plurality of wire through holes 182A may be spaced apart from each other in the circumferential direction of the base cover 182. In addition, the plurality of rod through holes 181A may be spaced apart from each other in the circumferential direction of the lower plate 181.

Meanwhile, the driving module 400 may include a rod 438, rod guides 440 and 450, a guide supporter 410, a lifter 430, and a revolution mechanism 420.

The rod guides 440 and 450 may be disposed below the figure base 180. The rod guides 440 and 450 may support the figure base 180 from below. The rod guides 440 and 450 may guide the lifting and lowering of the rod 438.

The rod guides 440 and 450 may include a guide body 440 and a guide cover 450.

The upper surface of the guide body 440 may be opened. The guide body 440 may have a cylindrical shape with an opened upper surface. In more detail, the guide body 440 may include a circular lower surface and a circumferential surface protruding upward from an edge of the lower surface.

The guide cover 450 may cover the open upper surface of the guide body 440. The guide cover 450 may have a substantial disc shape. The guide cover 450 may support the figure base 180.

A lower guide hole 441 through which the rod 438 passes may be formed at the lower surface of the guide body 440. An upper guide hole 451 through which the rod 438 passes may be formed in the guide cover 450. The lower guide hole 441 and the upper guide hole 451 may face each other in the vertical direction. Accordingly, the lower guide hole 441 and the upper guide hole 451 may guide the lifting and lowering of the rod 438.

A plurality of lower guide holes 441 and a plurality of the upper guide holes 451 may be provided, respectively. The plurality of lower guide holes 441 may be spaced apart from each other in the circumferential direction of the guide body 440. The plurality of upper guide holes 451 may be spaced apart from each other in the circumferential direction of the guide cover 450.

The upper guide hole 451 may face the rod through hole 181A of the figure base 180 or may communicate with the rod through hole 181A. Therefore, the rod 438 can pass easily through the rod through hole 181A.

The rod 138 may be disposed vertically. The rod 438 may press the outer end portion of the seesaw lever 190 upward through a rod through hole 181A formed at the lower surface of the figure base 180.

A plurality of rods 438 may be provided. The number of rods 438 may be equal to the number of seesaw levers 190.

The plurality of rods 438 may be spaced apart from each other in the circumferential direction of the rod guides 440 and 450. The plurality of rods 438 may be located on the third virtual source C3 having the same or similar diameter than the second virtual source C2. The center of the third virtual circle C3 may be located on the virtual vertical axis X passing through the center of the figure base 180.

The rod 438 may be formed with a stopper 439 which is caught around the upper end of the lower guide hole 441. The stopper 439 may extend in the radially outward direction of the rod 438 at the outer circumference of the rod 438. The stopper 439 may be located between the lower guide hole 441 and the upper guide hole 451. In other words, the stopper 439 may be located inside the guide body 440.

The diameter of the stopper 439 may be larger than the inner diameter of the lower guide hole 441. Accordingly, the stopper 439 may not pass through the lower guide hole 441 and may be caught around the upper end of the lower guide hole 441. In other words, the rod 438 may be supported by the stopper 439.

The guide supporter 410 may support the rod guides 440 and 450 from the lower side. The guide supporter 410 may include a supporter base 410A and a supporter pillar 410B that is erected perpendicularly to an upper surface of the supporter base 410A. For example, the supporter base 410A may have a disk shape, and a pair of supporter pillars 410B which have an arc shape and spaced apart from each other in the horizontal direction may be provided.

The guide supporter 410 may include a lifter 430 and a revolution mechanism 420 therein. In other words, the lifter 410 and the revolving mechanism 420 may be located above the supporter base 410A and may be located inside the supporter pillar 410B.

The lifter 430 may raise the rod 438. As described above, the lifter 430 may include a motor 431 and a lever 432 connected to the motor 431 and pressing the lower end of the rod 438 upward. However, the present disclosure is not limited thereto, and the lifter 430 may also include a vertical actuator.

At least one lifter 430 may be provided. The number of lifters 430 may be less than the number of rods 438. Since the number of rods 438 is the same as the number of seesaw levers 190, the number of lifters 430 may be smaller than the number of seesaw levers 190.

At least one lifter 430 can selectively move some of the plurality of rods 438. In more detail, by the revolution mechanism 420 to be described later, the lifter 430 may move to the lower side of the rod 438 of the plurality of rods 438, and raise the rod 438.

As the number of lifters 430 increases, the number of rods 438 that can be raised at the same time may increase. Each rod 438 is interlocked with different movable portions of the FIG. 100, so it is determined that which movable portion is moved depending on which rod 483 is raised.

The revolution mechanism 420 can revolve the lifter 430 about a virtual vertical axis X passing through the center of the figure base 180. The revolution mechanism 420 may move the lifter 430 below the rod 438 that is the target to be raised. Accordingly, the lifter 430 may selectively raise the rod 438 associated with the movable portion or the joint to be controlled.

The revolution mechanism 420 according to the present embodiment may include a rotation plate 421, a fixed gear 423, a moving gear 424, and a rotation motor 425.

The rotation plate 421 may be a disc plate. The rotation plate 421 may be disposed horizontally. The lifter 430 may be seated on the rotation plate 421. The rotation plate 421 may rotate about a virtual vertical axis X passing through the center of the figure base 180.

A protrusion portion 422 protruding downward may be formed at the center portion of the rotation plate 421. The protrusion portion 422 may have a cylindrical or hollow cylinder shape. The rotation plate 421 may rotate about the protrusion portion 422. In other words, the protrusion portion 422 may serve as a rotation shaft of the rotation plate 421.

The fixed gear 423 may be positioned below the rotation plate 421 and may have the virtual vertical axis X as a central axis. The fixed gear 423 may surround the outer circumference of the protrusion portion 422. In other words, the fixed gear 423 may restrain the protrusion portion 422 with respect to the horizontal direction.

The fixed gear 423 may be fastened to the upper surface of the lower plate 411 and may not rotate. The lower plate 411 may be positioned above the supporter base 410A and may be positioned below the rotation plate 421.

However, the present disclosure is not limited thereto, and the fixed gear 423 may be fastened to the upper surface of the supporter base 411.

The protruding wall 412 may protrude upward from the lower plate 411 or the supporter base 410A. The protruding wall 412 may be adjacent to the circumference of the rotation plate 421. The inner circumference of the protruding wall 412 may face the outer circumference of the rotation plate 421. The protruding wall 412 may prevent the rotation plate 421 from tilting or falling down and keep a state of being horizontal.

The moving gear 424 may be located below the rotation plate 421. The moving gear 424 may be engaged with the fixed gear 423. Accordingly, the moving gear 424 may rotate by the rotation motor 425 and revolve along the outer circumference of the fixed gear 423. In other words, the moving gear 424 may revolve about the virtual vertical axis X.

The rotation motor 425 may be mounted on the rotation plate 421. The rotation shaft of the rotation motor 425 may be vertical.

The rotation motor 425 may be located above the rotation plate 421, and the rotation plate 421 may be provided with a through hole 421A through which the rotation shaft of the rotation motor 425 or the connection shaft of the moving gear 424 passes. However, of course, the rotation motor 425 may be located below the rotation plate 421.

The lifter 430 may be seated on the rotation plate 421. When a plurality of lifters 430 are provided, the plurality of lifters 430 may be spaced apart from each other in the circumferential direction of the rotation plate 421.

As described above, the lifter 430 may include a motor 431 and a lever 432. The motor 431 may be seated on the rotation plate 421. The rotation shaft of the motor 431 may be horizontal. The rotation shaft of the motor 431 may be formed long in a direction orthogonal to the radial direction of the rotation plate 421.

The lever 432 may be disposed long in the radial direction of the rotation plate 421. Therefore, when the rotation plate 421 is rotated by a predetermined angle, the lever 432 may be located below the rod 438.

The angle of the lever 432 of the pair of lifters 430 adjacent to each other with respect to the virtual vertical axis X may be an integer multiple of the angle of the pair of rods 438 adjacent to each other with respect to the virtual vertical axis X. For example, as illustrated in FIG. 20, the angle 180° formed by the pair of levers 432 adjacent to each other is 4 times of the angle (45° formed by the pair of rods 438 adjacent to each other. Thus, when one lever 432 is located below the one rod 438, the other lever 432 may be located below the other rod 438.

Hereinafter, the operation of the revolution mechanism 420 according to the present embodiment will be described.

When the rotation motor 425 rotates the moving gear 424, the moving gear 424 and the rotation motor 425 may revolve along the outer circumference of the fixed gear 423. Accordingly, the rotation plate 421 equipped with the rotation motor 425 may rotate about the virtual vertical axis X, and the lifter 430 seated on the rotation plate 421 can revolve around the virtual vertical axis X.

The rotation plate 421 may rotate until the lever 432 of the lifter 430 moves to the lower side of the target rod 438. The target rod 438 may refer to a rod 438 interlocked with a movable portion or a joint to be moved.

Thereafter, the lifter 430 may raise the target rod 438. As a result, the movable portion or the joint interlocked with the target rod 438 may be movable.

Figure 21:
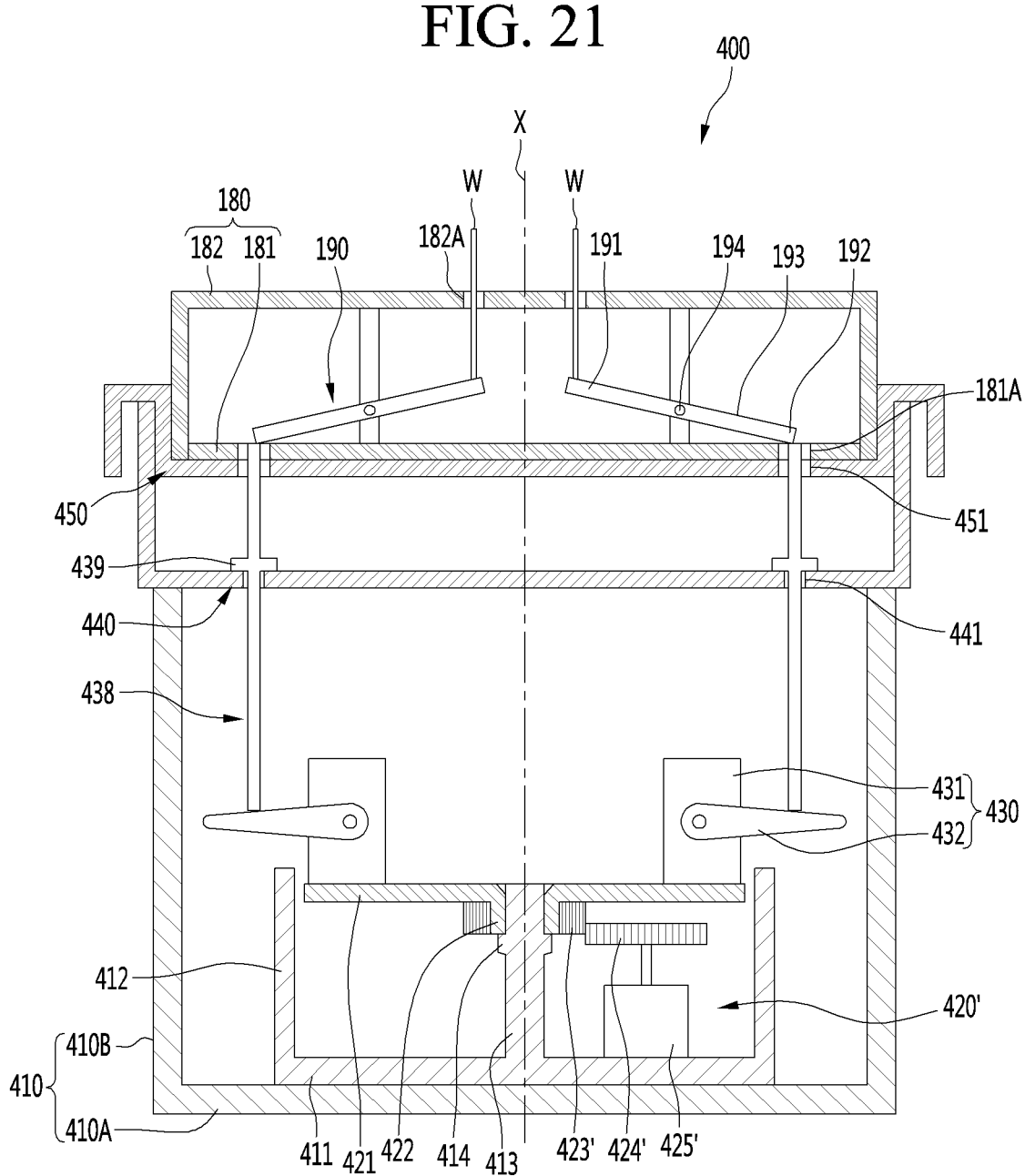
FIG. 21 is a sectional view illustrating the inside of a drive module according to another embodiment of the present disclosure.

FIG. 21 is a sectional view illustrating the inside of a drive module according to another embodiment of the present disclosure.

The action robot according to the present embodiment may be the same as the embodiment described with reference to FIGS. 18 to 20 except for the revolution mechanism and the configuration thereof. Therefore, hereinafter, redundant descriptions will be omitted and the description will be mainly focused on differences.

The revolution mechanism 420' according to the present embodiment may include a rotation plate 421, a rotation motor 425', a driving gear 424', and a driven gear 423'.

The protrusion portion 422 protruding downward from the center portion of the rotation plate 421 may have a hollow cylinder shape. The vertical bar 413 may be inserted into the hollow of the protrusion portion 422. Therefore, the rotation plate 421 may rotate about the vertical bar 413.

The vertical bar 413 may be positioned on the virtual vertical axis X. The vertical bar 413 may protrude upward from the lower plate 411 or the supporter base 410A.

The driven gear 423' may be fastened to the lower surface of the rotation plate 421. The driven gear 423' may surround the outer circumference of the protrusion portion 422. The driven gear 423' may rotate together with the rotation plate 421 about the virtual vertical axis X.

The driving gear 424' may be rotated by the rotation motor 425'. The driving gear 424' may be located below the rotation plate 421. The driving gear 424' may be engaged with the driven gear 423. Therefore, the rotational force of the driving gear 424' can be transmitted to the driven gear 423', and the driven gear 423' and the rotation plate 421' can rotate.

The rotation motor 425' may be spaced apart from the lower side of the rotation plate 421. The rotation motor 425' may be mounted to the lower plate 411 or the supporter base 410A. The rotation axis of the rotation motor 425' may be vertical.

Hereinafter, the operation of the revolution mechanism 420' according to the present embodiment will be described.

When the rotation motor 425' rotates the driving gear 424', the driven gear 423 and the rotation plate can rotate about the virtual vertical axis X, and the lifter 430 seated on the rotation plate 421 can revolve around the virtual vertical axis X.

The rotation plate 421 may rotate until the lever 432 of the lifter 430 moves to the lower side of the target rod 438. The target rod 438 may refer to a rod 438 interlocked with a movable portion or a joint to be moved. Thereafter, the lifter 430 may raise the target rod 438. As a result, the movable portion or the joint interlocked with the target rod 438 may be movable.

Figure 22:
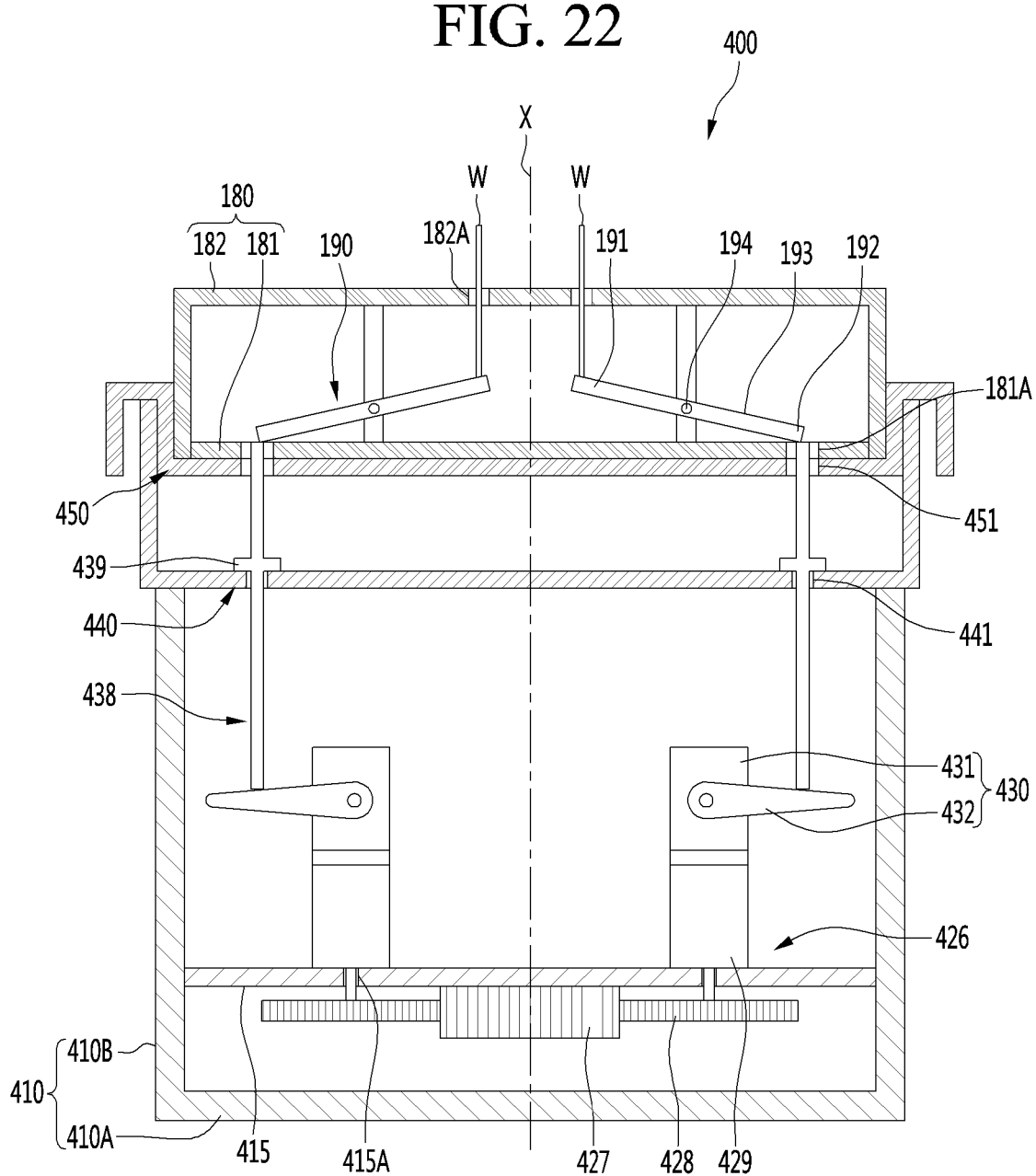
FIG. 22 is a sectional view illustrating the inside of a drive module according to another embodiment of the present disclosure.
Figure 23:
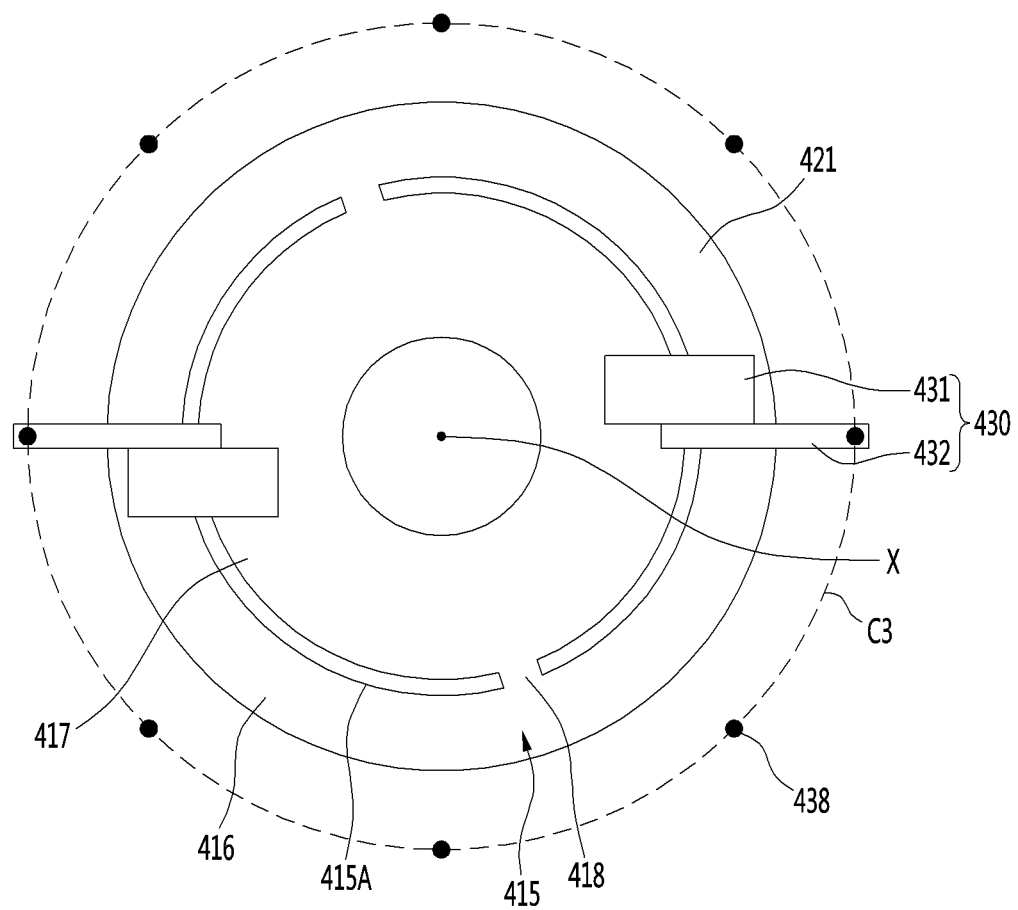
FIG. 23 is a view illustrating the revolution mechanism illustrated in FIG. 22 as viewed from above.

FIG. 22 is a sectional view illustrating the inside of a drive module according to another embodiment of the present disclosure, and FIG. 23 is a view illustrating the revolution mechanism illustrated in FIG. 22 as viewed from above.

The action robot according to the present embodiment may be the same as the embodiment described with reference to FIGS. 18 to 20 except for the revolution mechanism and the configuration thereof. Therefore, hereinafter, redundant descriptions will be omitted and the description will be mainly focused on differences.

The revolution mechanism 426 according to the present embodiment may include a fixed gear 427, a moving gear 428, and a rotation motor 429. The revolution mechanism 426 may further include a support plate 415 and a guide groove 415A.

The fixed gear 427 may have the virtual vertical axis X as a central axis. The fixed gear 427 may be fixed without rotation by being fastened to the lower surface of the support plate 415 to be described later.

The moving gear 428 may be located below the support plate 415. The moving gear 428 may be engaged with the fixed gear 427. Thus, the moving gear 428 can rotate by the rotation motor 429 and revolve along the outer circumference of the fixed gear 427. In other words, the moving gear 428 can revolve around the virtual vertical axis X.

The rotation motor 429 may be connected to the moving gear 428 to rotate the moving gear 428. The rotation motor 429 may revolve about the virtual vertical axis X together with the moving gear 428. The rotation axis of the rotation motor 429 may be vertical.

The lifter 430 may be connected to the moving gear 428 or the rotation motor 429. The number of each of the rotation motor 429 and the moving gear 428 may be equal to the number of the lifters 430.

More specifically, as illustrated in FIG. 22, when the rotation motor 429 is positioned above the support plate 415, the lifter 430 may be connected to the rotation motor 429, and the rotation motor 429 may be connected to the moving gear 428 through the guide groove 415A which will be described later.

On the other hand, although not illustrated in the drawing, when the rotation motor 429 is located below the support plate 415, the lifter 430 may be connected to the moving gear 428 through the guide groove 415A, which will be described later, and the rotation motor 429 may be connected to the moving gear 428 at the lower side of the moving gear 428.

Accordingly, the lifter 430 may revolve about the virtual vertical axis X together with the rotation motor 429 and the moving gear 428.

In addition, the lifter 430 and the rotation motor 429 may rotate and revolve similarly to the moving gear 428. Thus, in order for the lever 432 of the lifter 430 to always be maintained in the radial direction of the support plate 415, the rotation period and the revolution period of the lifter 430, the rotation motor 439, and the moving gear 428 may be the same.

The support plate 415 may be a disc plate. The support plate 415 may be positioned below the lifter 430 and may be positioned above the fixed gear 427 and the moving gear 428. The support plate 415 may be disposed horizontally. The support plate 415 may be spaced apart from the upper side of the supporter base 410A. The support plate 415 is fixed and may not rotate.

The support plate 415 may be formed with a guide groove 415A having a circular or arc shape. The guide groove 415A may guide the revolution of the lifter 430, the rotation motor 439, and the moving gear 428.

In more detail, the support plate 415 may include an outer plate 416 located outside the guide groove 415A and an inner plate 417 located inside the guide groove 415A. If the guide groove 415A is arc-shaped, the support plate 415 may further include a connection plate 418 connecting the outer plate 416 and the inner plate 417.

With respect to the radial direction of the support plate 415, the connection plate 418 may be directed between a pair of rods 438 adjacent to each other. As a result, the lifter 430 may move downward of the rod 438 without being disturbed by the connection plate 418.

Hereinafter, the operation of the revolution mechanism 426 according to the present embodiment will be described.

When the rotation motor 429 rotates the moving gear 428, the moving gear 428 may revolve along the outer circumference of the fixed gear 427. Accordingly, the lifter 430 and the rotation motor 429 connected to the moving gear 428 may revolve about the virtual vertical axis X along the guide groove 415A of the support plate 415.

The lifter 430 may rotate until the lever 432 moves below the target rod 438. The target rod 438 may refer to a rod 438 interlocked with a movable portion or a joint to be movable. Thereafter, the lifter 430 may raise the target rod 438. As a result, the movable portion or the joint linked with the target rod 438 may be movable.

In the revolution mechanism 426 according to this embodiment, when a plurality of lifters 430 are provided, there is an advantage that the multiple of lifters 430 can each independently revolve. Therefore, the plurality of target rods 438 can be raised simultaneously regardless of the arrangement of the multiple of rods 438. In other words, a combination of the movable portions or the joints that are movable at the same time can be varied.

On the other hand, in the revolution mechanism 420 and 420' according to the above-described embodiment, since the plurality of lifters 430 revolve together with the rotation plate 421, the combination of movable portions or joints that are movable at the same time is limited.

Figure 24:
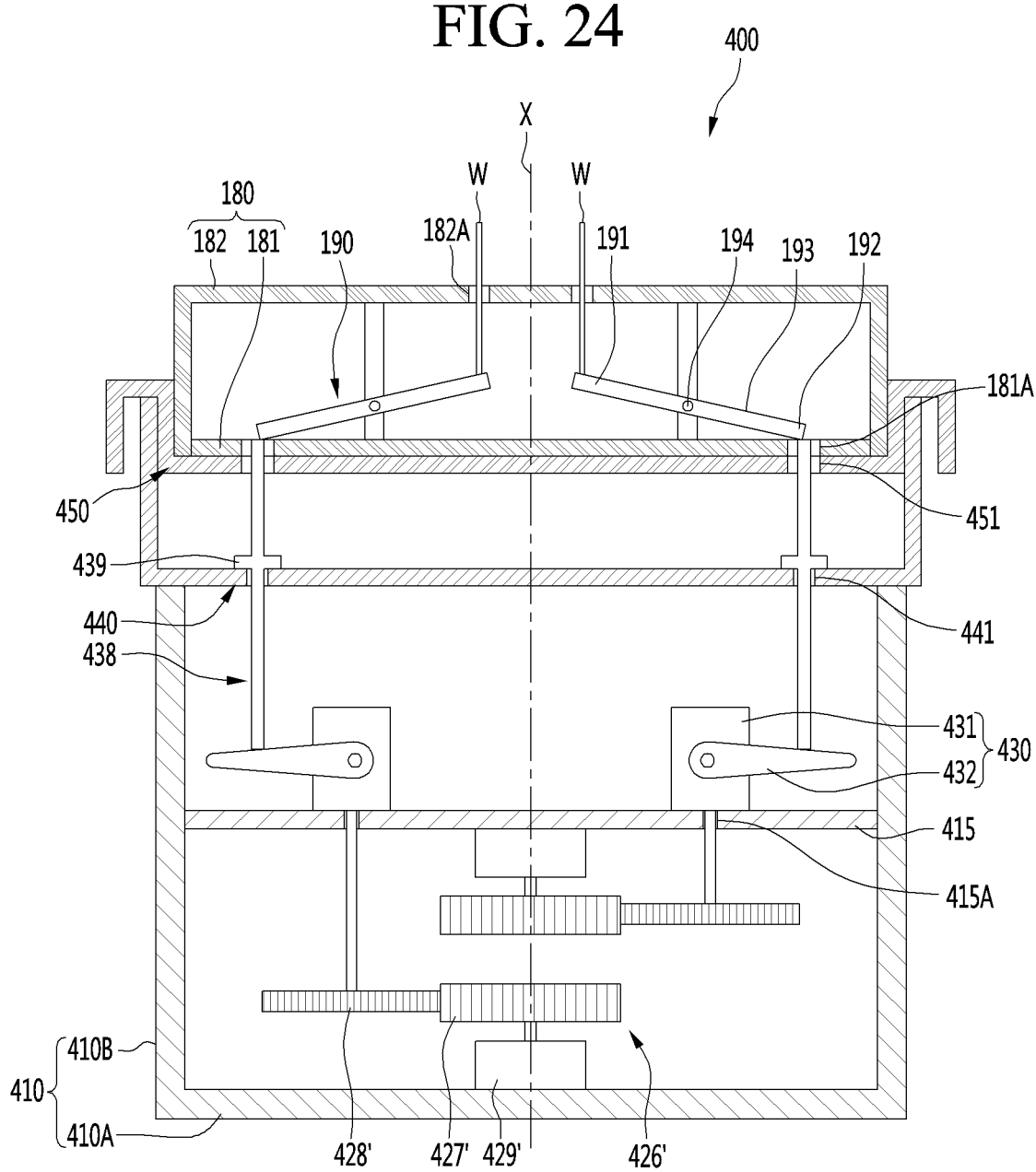
FIG. 24 is a sectional view illustrating the inside of a drive module according to another embodiment of the present disclosure.

FIG. 24 is a sectional view illustrating the inside of a figure base and a drive module according to another embodiment of the present disclosure.

The action robot according to the present embodiment may be the same as the embodiment described with reference to FIGS. 22 to 23 except for a revolution mechanism and a configuration thereof. Therefore, hereinafter, redundant descriptions will be omitted and the description will be mainly focused on differences.

The revolution mechanism 426' according to the present embodiment may include a driving gear 427', a driven gear 428', and a rotation motor 429'. The revolution mechanism 426' may further include a support plate 415 and a guide groove 415A.

The driving gear 427' may rotate about the virtual vertical axis X. The driving gear 427' may be located below the support plate 415.

The driven gear 428' may be located below the support plate 415. The driven gear 428' may be engaged with the driving gear 427'. Therefore, the driven gear 428' can rotate by the rotation motor 429' and revolve along the outer circumference of the driving gear 427'. In other words, the driven gear 428' may revolve about the virtual vertical axis X.

Rotation motor 429' may be coupled to driving gear 427' to rotate the driving gear 427'. The rotation motor 429' may be positioned below the support plate 415. The rotation axis of the rotation motor 429 may be vertical and may be located on the virtual vertical axis X.

The lifter 430 may be connected to the driven gear 428'. The lifter 430 may be connected to the driven gear 428' through the guide groove 415A.

Accordingly, the lifter 430 may revolve about the virtual vertical axis X together with the driven gear 428'.

In addition, the lifter 430 may rotate and revolve similarly to the driven gear 428'. Thus, in order for the lever 432 of the lifter 430 to always be maintained in the radial direction of the support plate 415, the rotation period and the revolution period of the lifter 430 and the driven gear 428' may be the same.

The support plate 415 may be located below the lifter 430 and may be located above the driving gear 427', the driven gear 428', and the rotation motor 429'.

The guide groove 415A may guide the revolution of lifter 430 and driven gear 428'.

The number of rotation motors 429', driving gear 427', and driven gear 428' may be equal to the number of lifters 430.

One driving gear 427' for revolving one lifter 430 may be located above the other driving gear 427' for revolving another lifter 430. The rotation motor 429' for rotating the one driving gear 427' may be fastened to the lower surface of the support plate 415, and the rotation motor 429' for rotating the other driving gear 427' may be fastened to the upper surface of the supporter base 410A.

Hereinafter, the operation of the revolution mechanism 426' according to the present embodiment will be described.

When the rotation motor 429' rotates the driving gear 427', the driven gear 428' can revolve along the outer circumference of the driving gear 427'. Therefore, the lifter 430 connected to the driven gear 428' may revolve about the virtual vertical axis X along the guide groove 415A of the support plate 415.

The lifter 430 may rotate until the lever 432 moves below the target rod 438. The target rod 438 may refer to a rod 438 interlocked with a movable portion or a joint to be movable. Thereafter, the lifter 430 can raise the target rod 438. As a result, the movable portion or the joint interlocked with the target rod 438 may be movable.

The above description is merely illustrative of the technical idea of the present disclosure, and those skilled in the art to which the present disclosure pertains may make various modifications and variations without departing from the essential characteristics of the present disclosure.

Therefore, the embodiments disclosed in the present disclosure are not intended to limit the technical idea of the present disclosure but to describe the present disclosure, and the scope of the technical idea of the present disclosure is not limited by these embodiments.

The scope of protection of the present disclosure should be interpreted by the following claims, and all technical ideas within the scope equivalent thereto should be construed as being included in the scope of the present disclosure.

According to a preferred embodiment of the present disclosure, the revolution mechanism allows the lifting of a larger number of rods with a smaller number of lifters. Thereby, there is an advantage that the size of the action robot is compact and the material cost thereof is reduced.

In addition, the revolution mechanism may include a rotation plate and a rotation motor for rotating the rotation plate. Thereby, there is an advantage that the plurality of lifters mounted on the rotation plate can be revolved at once by a single rotation motor.

In addition, the revolution mechanism may include a guide groove for guiding the revolution of the lifter and a rotation motor for revolving each lifter. In this way, a combination of movable portions or joints that are simultaneously movable can be varied.

What is claimed is:

1. An action robot comprising;
   a figure configured to have a plurality of joints and a plurality of wire supporters;
   a figure base configured to support the figure from below;
   a plurality of seesaw levers configured to be embedded in the figure base, the plurality of seesaw levers being configured to be disposed to be long in a radial direction of the figure base, the plurality of seesaw levers being configured to be spaced apart from each other in a circumferential direction of the figure base;
   a wire configured to be connected to an inner end portion of one of the seesaw levers and one of the wire supporters to pivot one of the joints;
   a plurality of rods configured to be disposed vertically, one of the plurality of rods being configured to press an outer end portion of the seesaw lever upward, the plurality of rods being located under the plurality of seesaw levers;
   at least one lifter positioned below the figure base and configured to raise the rod; and
   a revolution mechanism positioned below the figure base and configured to revolve the lifter about a virtual vertical axis passing through a center of the figure base,
   wherein a number of the at least one lifter is less than a number of the rods,
   wherein the action robot further comprises:
      a rod guide positioned below the figure base, the rod guide being configured to guide lifting and lowering of the rod; and
      a guide supporter positioned below the rod guide, the guide supporter having a space in which the lifter and the revolution mechanism is embedded, and
   wherein the rod guide includes:
      a guide body configured to have an opened upper surface;
      a lower guide hole formed at a lower surface of the guide body, the lower guide hole being configured to allow the rod to be passed therethrough;
      a guide cover configured to cover the opened upper surface of the guide body; and
      an upper guide hole formed on the guide cover, the upper guide hole being configured to allow the rod to be passed through.

2. The action robot of claim 1, wherein a wire through hole through which the wire passes is formed on an upper surface of the figure base, and
   wherein a rod passing hole through which the rod passes is formed on a lower surface of the figure base.

3. The action robot of claim 1, wherein inner end portions of the plurality of seesaw levers are located on a first virtual circle which has the virtual vertical axis as a center, and
   wherein the outer end portions of the plurality of seesaw levers are located on a second virtual circle which has the virtual vertical axis as a center, and a diameter of the second virtual circle is larger than a diameter of the first virtual circle.

4. The action robot of claim 1, wherein the revolution mechanism includes:
   a rotation plate configured to allow the lifter to be seated, the rotation plate being configured to rotate about the virtual vertical axis;
   a fixed gear configured to be located below the rotation plate, the fixed gear being configured to have the virtual vertical axis as a central axis;
   a moving gear configured to be engaged with the fixed gear, the moving gear configured to revolve along the outer circumference of the fixed gear; and
   a rotation motor configured to be mounted to the rotation plate, the rotation motor being configured to rotate the moving gear.

5. The action robot of claim 4, wherein the lifter is provided in plurality which are spaced apart from each other in the circumferential direction of the rotation plate.

6. The action robot of claim 4, wherein the lifter includes:
   a motor configured to be seated on the rotation plate; and
   a lever configured to be connected to the motor, the lever being configured to press a lower end of the rod upward, the lever being configured to be disposed to be long in the radial direction of the rotation plate.

7. The action robot of claim 6, wherein a rotation axis of the motor of the lifter is horizontal, and
   wherein the rotation axis of the rotation motor is vertical.

8. The action robot of claim 1, wherein the revolution mechanism includes:
   a rotation plate configured to allow the lifter to be seated, the rotation plate being configured to rotate about the virtual vertical axis;
   a rotation motor configured to be spaced apart from the lower side of the rotation plate;
   a driving gear configured to be connected to the rotation motor; and
   a driven gear configured to be engaged with the driving gear, the driven gear being configured to be fastened to a lower surface of the rotation plate, the driven gear being configured to rotate about the virtual vertical axis.

9. The action robot of claim 1, wherein the rod is formed with a stopper which is formed on an outer circumference of the rod, located between the lower guide hole and the upper guide hole, and has a diameter larger than an inner diameter of the lower guide hole.

10. The action robot of claim 1, wherein the revolution mechanism includes:
    a fixed gear configured to have the virtual vertical axis as a central axis;
    a moving gear configured to be engaged with the fixed gear, the moving gear being configured to revolve along the outer circumference of the fixed gear; and
    a rotation motor configured to rotate the moving gear,
    wherein the lifter is connected to the moving gear or the rotation motor.

11. The action robot of claim 10, wherein a rotation period of the moving gear corresponds to a revolution period of the moving gear.

12. The action robot of claim 10, wherein the revolution mechanism further includes:
    a support plate configured to be positioned below the lifter, the support plate being configured to be positioned above the fixed gear and the moving gear; and
    a guide groove configured to be formed on the support plate, the guide groove being configured to guide the revolution of the lifter, the guide groove being configured to have a circular or arc shape.

13. The action robot of claim 1, wherein the revolution mechanism includes:

a rotation motor:

a driving gear configured to have the virtual vertical axis as a central axis, the driving gear being configured to rotate by the rotation motor; and a driven gear configured to be engaged with the driving gear, the driven gear being configured to revolve along the outer circumference of the driving gear;

wherein the lifter is connected to the driven gear.

14. The action robot of claim 13, wherein a rotation period of the driven gear corresponds to a revolution period of the driven gear.

15. The action robot of claim 13, wherein the revolution mechanism further includes:

a support plate configured to support the lifter from below, the support plate being configured to be positioned above the driving gear and the driven gear; and a guide groove configured to be formed on the support plate, the guide groove being configured to guide the revolution of the lifter, the guide groove being configured to have a circular or arc shape.

16. The action robot of claim 13, wherein the lifter is provided in plurality, and wherein the driving gear for revolving one of the lifters is located above the driving gear for revolving another one of the lifters.

* * * * *